(12) United States Patent
Singh et al.

(10) Patent No.: US 6,958,627 B2
(45) Date of Patent: Oct. 25, 2005

(54) ASYNCHRONOUS PIPELINE WITH LATCH CONTROLLERS

(75) Inventors: Montek Singh, Chapel Hill, NC (US); Steven M. Nowick, Leonia, NJ (US)

(73) Assignee: Trustees of Columbia University in the City of New York, New York, NY (US)

( * ) Notice: Subject to any disclaimer, the term of this patent is extended or adjusted under 35 U.S.C. 154(b) by 101 days.

(21) Appl. No.: 10/380,137

(22) PCT Filed: Sep. 21, 2001

(86) PCT No.: PCT/US01/29721

§ 371 (c)(1),
(2), (4) Date: Oct. 2, 2003

(87) PCT Pub. No.: WO02/35346

PCT Pub. Date: May 2, 2002

(65) Prior Publication Data

US 2004/0046590 A1 Mar. 11, 2004

Related U.S. Application Data

(60) Provisional application No. 60/242,587, filed on Oct. 23, 2000.

(51) Int. Cl.[7] .............................................. H03K 19/00
(52) U.S. Cl. .............................. 326/93; 326/94; 326/95
(58) Field of Search ........................... 326/93–98, 112, 326/119, 121

(56) References Cited

U.S. PATENT DOCUMENTS

| 6,028,453 A | 2/2000 | Kong | 326/113 |
| 2002/0069347 A1 | 6/2002 | Singh | 712/216 |

FOREIGN PATENT DOCUMENTS

| EP | 0913768 | 5/1999 | G06F/9/38 |
| WO | 0182053 | 11/2001 | G06F/5/06 |
| WO | 0182064 | 11/2001 | G06F/9/38 |
| WO | 0195089 | 12/2001 | G06F/5/06 |

OTHER PUBLICATIONS

McLaughlin K et al: "A static technique for high–speed CMOS state machine design" ASIC Conference and Exhibit, 1994. Proceedings., Seventh Annual IEEE International Rochester, NY USA Sep. 19–23, 1994, New York, NY, USA IEEE, (Sep. 19, 1994), pp. 108–111, XP010140513 ISBN: 0–7803–2020–4 the whole document.

(Continued)

*Primary Examiner*—Anh Q. Tran
(74) *Attorney, Agent, or Firm*—Baker Botts LLP

(57) ABSTRACT

An asynchronous pipeline for high-speed applications uses simple transparent latches in its datapath and small latch controllers for each pipeline stage. The stages communicate with each other using request signals and acknowledgment signals. Each transition on the request signal indicates the arrival of a distinct new data item. Each stage comprises a data latch that is normally enabled to allow data to pass through, and a latch controller that enables and disables the data latch. The request signal and the data are inputs to the data latch. Once the stage has latched the data, a done signal is produced, which is sent to the latch controller, to the previous stage as an acknowledgment signal, and to the next stage as a request signal. The latch controller disables the latch upon receipt of the done signal, and re-enables the data latch upon receipt of the acknowledgment signal from the next stage. For correct operation, the request signal must arrive at the stage after the data inputs have stabilized. The asynchronous pipeline may incorporate logic elements to combine data, as well as matched delay elements for the request, acknowledgment, and done signals. The asynchronous pipeline may also incorporate clocked CMOS logic gates. Fork and join structures are also provided by the asynchronous pipeline design.

20 Claims, 16 Drawing Sheets

OTHER PUBLICATIONS

M. Borah, R.M.Owens, and M.J. Irwai, High–throughput low–power DSP using clocked CMOS circuitry. In *Proc. In Symp. on Low–Power Design*, pp. 139–144, 1995.

A. Davis and S.M.Nowick, Asynchronous circuit design: Motivation, background, and methods. In G.Birswistle and A. Davis, editors, Asynchronous Digital Circuit Design, Workshops in Computing, pp. 1–49. Springer–Verlag, 1995.

P. Day and J.V. Woods, Investigation into micropipeline latch design styles. IEEE TVLSI 3(2):264–272, Jun. 1995.

A. Doopley and K. Yun. Optimal clocking and enhanced testability for high–performance self–resetting domino properties, in *Conference on Advanced Research in VLSI*, 1999.

H. v. Gagledonk, D. Baumann, K. van Berkel, D. Gloor, A. Peeters, and G. Stegmann. An asynchronous low–power 80C51 microcontroller. In *Proc. Intl. Symp. Adv. Res. Async. Circ. Stst. (ASYNC)*, pp. 96–107,1998.

D. Harris and M. Horowitz. Skew–tolerant domino circuits. *IEEE JSSC*. 32(11):1702–1711, Nov. 1997.

Q. Hauck, M. Garg, and S.A.Huss, Two–phase asynchronous wave–pipelines and their application to a 2D–DCT. In *Proc. Intl. Symp. Adv. Res. Async. Circ. Stst. (ASYNC)*, Apr. 1999.

W. Liu, C.T. Gray, D. Fan, W.J. Farlow, T.A. Hughes, and R.K. Cavin. A 250–MHz wave pipelined adder in 2–$\mu$m CMOS. *IEEE JSSC*, 29(9):1117–1128, Sep. 1994.

C. Molnar, I. Jones, W. Coates, J. Lexau, S. Fairbanks, and I. Sutherland. Two FIFO ring performance experiments. Proceedings of the *IEEE*, 87(2):297–307, Feb. 1999.

A. Mukherjee, R. Sudhakar, M. Marke–Sadowska, and S. Long. Wave steering in YADDs: a novel non–iterative syntheses and layout technique. In *Proc. DAC*. 1999.

V. Narayanan, B. Chappell, and B. Fleischer. Static timing analysis for self resetting circuits. In *Proc. ICCAD*, 1996.

S. Schuster, W. Reohr, P. Cook, D. Heidel, M. Immediato, and K. Jenkins, Asynchronous interlocked pipelined CMOS circuits operating at 3.3–4.5 GHz. In *Proc. ISSCC*, Feb. 2000.

C.L. Seitz, "System Timing", Introduction to VLSI Systems, Ch. 7, Addison–Wesley, 1980.

M. Singh and S. M. Nowick, Fine–grained pipelined asynchronous adders for high–speed DSP applications. In *IEEE Computer Society Annual Workshop on VLSI*, IEEE Computer Society Press, Apr. 2000.

M. Singh and S. Nowick. High–throughput asynchronous pipelines for fine–grain dynamic datapaths. In *Proc. Ind. Symp. Adv. Res. Async. Circ. Syst. (ASYNC)*, 2000.

I.E. Sutherland, Micropipelines, *Communications of the ACM*, 32(6):720–738, Jun. 1989.

C. van Berkel. M. Josephs, and S. Nowick. Scanning the technology: Applications of asynchronous circuits. Proceedings of the IEEE, 87(2):223–233, Feb. 1999.

T. Williams. Self–Timed Rings and their Application to Division, Ph.D. thesis, Stanford University, Jun. 1991.

D. Wong, G. De Micheli, and M. Flynn. Designing high–performance digital circuits using wave–pipelining. IEEE TCAD, 12(1):24–46, Jan. 1993.

G. Yee and C. Sechen, Clock–delayed domino for adder and combinational logic design. In *Proc. ICCD*, Oct. 1996.

K.Yun, P. Beerel, and J. Arceo. High–performance asynchronous pipeline circuits. In *Proc. Intl. Symp. Adv. Res. Async. Circ. Syst. (ASYNC)*, 1996.

J. Ebergen, "Squaring the FIFO in GasP," *Proc. Intl. Symp. Adv. Res. Async. Circ. Syst. (ASYNC)*, pp. 194–205, IEEE Computer Society Press, Mar. 2001.

S.B. Furber and P.Day, "Four–Phase Micropipeline Latch Control Circuits," *IEEE TVLSI*, 4(2):247–253, Jun. 1996.

S.M.Nowick et al., Speculative Completion for the Design of High–Performance Asynchronous Dynamic Adders, *Proc. Intl. Symp. Adv. Res. Async. Circ. Syst.*, IEEE Computer Society Press, Apr. 1997, pp. 210–223.

I. Sutherland and S. Fairbanks, "GasP: A Minimal FIFO Control," *Proc. Intl. Symp. Adv. Res. Async. Circ. Syst. (ASYNC)*, pp. 46–53, IEEE Computer Society Press, Mar. 2001.

International Application Ser. No. PCT/US01/29721, International Search Report, Sep. 21, 2001.

Montek Singh and Steven M. Nowick, MOUSETRAP: Ultra High–Speed Transition–Signaling Asynchronous Pipelines, ACM "Tau–00" workshop (Dec. 4–5, 2000), ACM Workshop on Timing Issues in the Specification and Synthesis of Digital Systems. (This is the same as Provisional Appl. No. 60/242,587.).

S. Furber, "Computing without Clocks: Micropipelining the ARM Processor," *Asynchronous Digital Circuit Design, Workshops in Computing*(eds. G. Birtwistle et al.), Springer–Verlag, 1995, pp. 211–262 No month.

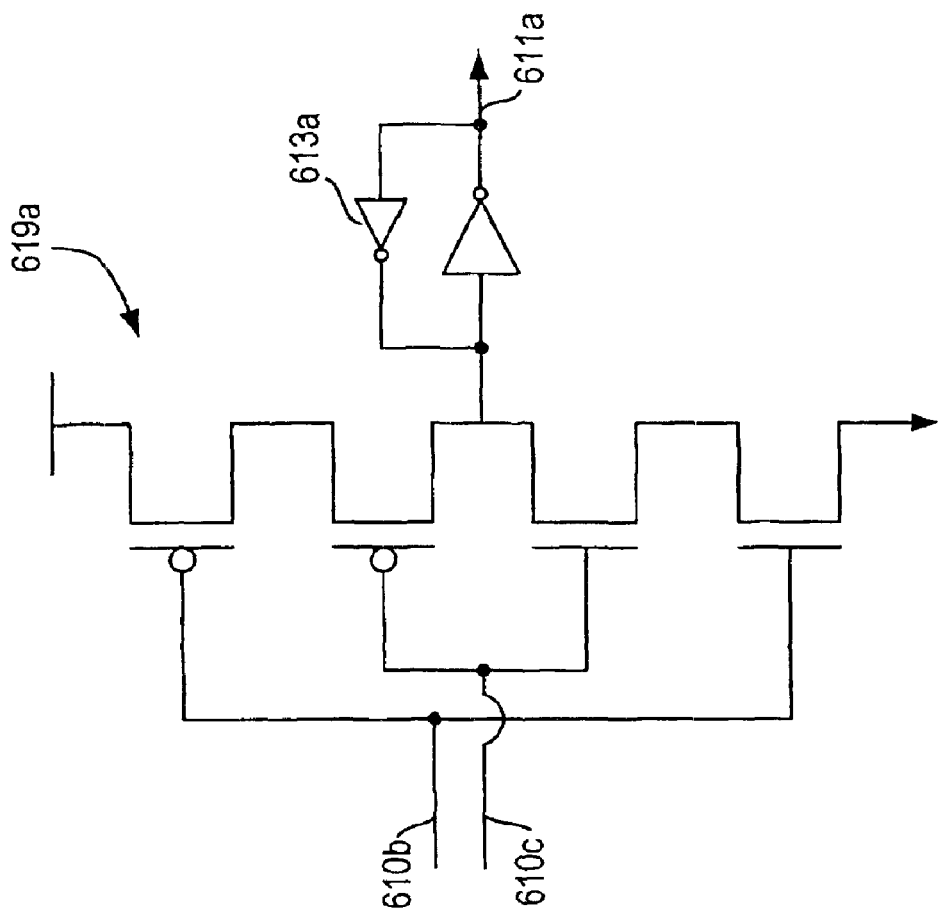
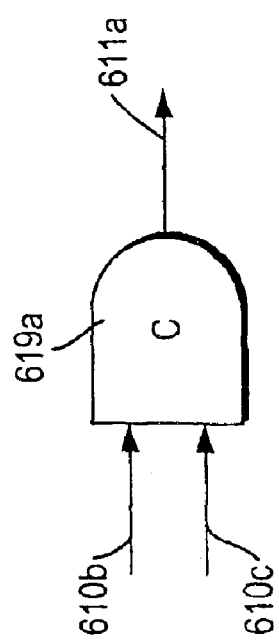
FIG. 14
FIG. 13

ASYNCHRONOUS PIPELINE WITH LATCH CONTROLLERS

CROSS-REFERENCE TO RELATED APPLICATION

This application claims the benefit under 35 U.S.C §365 of international Application PCT/US01/29721, filed Sep. 21, 2001; and which claims benefit to U.S. Provisional Patent Application entitled "Mousetrap: A High-Throughput Asynchronous Pipeline Style Using a Transition-Signaling Protocol," Ser. No. 60/242,587, which was filed on Oct. 23, 2000, which is incorporated by reference in its entirety herein.

STATEMENT OF GOVERNMENT RIGHT

The present invention was made in part with support from U.S. National Science Foundation (NSF), grant no. CCR-97-34803. Accordingly, the U.S. Government may have certain rights to this invention.

BACKGROUND OF THE INVENTION

1. Field of the Invention

This invention relates to asynchronous pipelines, and more particularly to asynchronous pipelines for high-speed applications which uses blocks of static logic for processing data, and simple transparent latches to separate data items.

2. Background of Related Art

Several synchronous pipelines have been proposed for high-throughput applications. In wave pipelining, multiple waves of data are propagated between two latches. (See, for example, D. Wong, G. DeMicheli, and M. Flynn, "Designing High-Performance Digital Circuits Using Wave-Pipelining," *IEEE TCAD*, 12(1):24–46, January 1993; W. Liu, C. T. Gray, D. Fan, W. J. Farlow, T. A. Hughes, and R. K. Cavin, "A 250-MHz Wave Pipelined Adder in 2-$\mu$m CMOS," *IEEE JSSC*, 29(9):1117–1128, September 1994; and A. Mukherjee, R. Sudhakar, M. Marek-Sadowska, and S. Long, "Wave Steering in YADDs: A Novel Non-Iterative Synthesis and Layout Technique, *Proc. DAC*, 1999.) However, this approach requires substantial design effort, from the architectural level down to the layout level, for accurate balancing of path delays (including data-dependent delays), and remains highly vulnerable to process, temperature and voltage variations. Other aggressive approaches include clock-delayed domino (See G. Yee and C. Sechen, "Clock-Delayed Domino For Adder and Combinational Logic Design," *Proc. ICCD*, October 1996), skew-tolerant domino (See D. Harris and M. Horowitz, "Skew-Tolerant Domino Circuits," *IEEE JSSC*, 32(11):1702–1711, November 1997; A. Dooply and K. Yun, "Optimal Clocking and Enhanced Testability for High-Performance Self-Resetting Domino Pipelines," *ARVLSI'99*), and self-resetting circuits (See V. Natayanan, B. Chappell, and B. Fleischer, "Static Timing Analysis For Self Resetting Circuits," *Proc. ICCAD*, 1996; A. Dooply and K. Yun, "Optimal Clocking and Enhanced Testability for High-Performance Self-Resetting Domino Pipelines," *ARVLSI'99*). These designs require complex timing constraints which are difficult to verify. They also lack elasticity and still require high-speed global clock distribution.

In addition, many asynchronous pipelines have been proposed. The classic asynchronous pipelines are called micropipelines (See I. E. Sutherland, "Micropipelines," *Communications of the ACM*, 32(6):720–738, June 1989). This style uses elegant control, but has slow and complex capture-pass latches which hinder performance.

A number of variants using alternative control and latch structures have been proposed (See P. Day and J. V. Woods, "Investigation Into Micropipeline Latch Design Styles," *IEEE TVLSI*, 3(2):264–272, June 1995; K. Yun, P. Beerel, and J. Arceo, "High-Performance Asynchronous Pipelines Circuits," *Proc. Intl. Symp. Adv. Res. Async. Circ. Syst. (ASYNC)*, 1996; and C. Molnar, I. Jones, W. Coates, J. Lexau, S. Fairbanks, and I. Sutherland, "Two FIFO Ring Performance Experiments," *Proceedings of the IEEE*, 87(2) :297–307, February 1999), but in each case the performance is limited due either to excessive control delays or to sizable latch delays.

These pipeline designs fall into two categories: (1) pipelines that use phase conversion, and (2) pipelines that do not use phase conversion. The pipelines described in Sutherland, "Micropipelines," and Day and Woods, "Investigation into Micropipeline Latch Design Styles," cited above, and C. Molnar and I. W. Jones, "Simple Circuits that Work For Complicated Reasons," *Proc. Intl. Symp. Adv. Res. Async. Circ. Syst. (ASYNC)*, pp. 138–149, April 2000, all use phase conversion. In contrast, the pipelines of S. B. Furber and P. Day, "Four-Phase Micropipeline Latch Control Circuits," *IEEE TVLSI*, 4(2):247–253, June 1996, and K. Yun, P. Beerel, and J. Arceo, "High-Performance Asynchronous Pipelines Circuits," cited above, do not use phase conversion.

The micropipelines of Sutherland, (See, e.g., FIG. 14 thereof) and Day and Woods (See, e.g., FIG. 10 thereof) use phase conversion. The micropipeline stage N 10 uses transition signaling and transparent latches 12, as illustrated in FIG. 1. Data is received at data input 14 from stage N−1 (not shown in FIG. 1) and data is transmitted to stage N+1 (not shown in FIG. 1) at data output 16. Control of the latch 12 is complex, and performed by at least three elements: a C element 18, an exclusive NOR element (XNOR) 20, and a toggle component 22. The output of C element 18 is doneN 35, which serves as an input to XNOR 20, along with ack$_N$ 32 received from stage N+1. The output En 36 of XNOR 20 enables the latch element 12. The toggle element 16 routes transitions received on its input 21 to one of two outputs 24 and 26 alternately, starting with the output 26, labeled with a dot. The output 26 is routed to stage N+1 as req$_{N+1}$ 30 and to stage N−1 as ack$_{N-1}$ 31. A disadvantage of these designs is that the critical paths are long: (1) from request signal req$_N$ 28 received from stage N−1 to request signal req$_{N+1}$ 30 transmitted to stage N+1, there are four component delays, i.e., delays from the C-element 18, the XNOR 20, the latch 12, and the toggle 22; and (2) from acknowledgment signal ack$_N$ 32 received from stage N+1 to the input 33 of the C-element 18 (to half-enable it), there are three component delays, i.e., delays from the XNOR 20, the latch 12, and the toggle 22.

The pipelines described by Molnar and Jones, "Simple Circuits That Work for Complicated Reasons," cited above, also use phase conversion. They are referred to as "Charlie boxes," and include simpler designs, such as the S style described therein. However, these designs generate a relatively late completion signal. Moreover, these designs do not propose extensions to handle complex pipelining, i.e., forks and joins, nor do they disclose "waveform shaping" strategy, elimination of critical inverters through dual-rail control, or use of a clocked-CMOS style.

There are several alternative pipeline designs which do not use phase conversion. In Furber and Day, "Four-Phase Micropipeline Latch Control Circuits," cited above, three distinct 4-phase protocols for asynchronous pipelines are proposed: (1) fully-decoupled, (2) long-hold and (3) semi-decoupled. These designs have several disadvantages: in the first two protocols, pipeline control is complex. For the best of their designs, i.e., semi-decoupled, which introduces a highly concurrent protocol, there is a minimum of four components on the critical cycle. These components are all C-elements, two of which have stack depth of three, and additional inverters are actually implied for correcting polarity.

A final alternative approach is to retain transition-signaling control, but replace the transparent latches with dual-edge-triggered D-flip-flops (DETDFF's), as cited in K. Yun, P. Beerel, and J. Arceo, "High-Performance Asynchronous Pipelines Circuits," above. According to this design, data is latched each time the latch control is toggled. While this approach avoids the overhead of phase conversion, it incurs a heavy performance penalty because DETDFF'S are significantly slower than transparent latches, and are also much larger.

A new pipeline style, referred to as "GasP," has been proposed which obtains even higher throughputs (See I. Sutherland and S. Fairbanks, "GasP: A Minimal FIFO Control," Proc. Intl. Symp. Adv. Res. Async. Circ. Syst. (ASYNC), pp. 46–53. IEEE Computer Society Press, March 2001; and J. Ebergen, "Squaring the FIFO in GasP," Proc. Intl. Symp. Adv. Res. Async. Circ. Syst. (ASYNC), pp. 194–205, IEEE Computer Society Press, March 2001). However, this approach aims for fine-grain transistor sizing to achieve delay equalization for all gates in the control circuitry, and the protocol has more complex timing constraints.

It is therefore an object of the invention to provide a pipeline which has a simplified control, and reduced control delays and latch delays.

It is another object of the invention to provide a pipeline which does not require delay equalization.

It is still another object of the invention to provide a pipeline which has simple one-sided timing constraints.

It is a further object of the invention to provide a pipeline which provides extensions to handle complex pipelining such as forks and joins.

It is a still further object of the invention to provide a pipeline which provides a latch switching optimization.

It is yet another object of the invention to provide a pipeline having a very fine-grain structure that is especially suitable for producing high throughputs.

SUMMARY OF THE INVENTION

These and other objects of the invention which will become apparent with respect to the disclosure herein, are accomplished by an asynchronous digital pipeline circuit for processing data in an environment comprising at least one processing stage.

The processing stage comprises a latch controller and a data latch. The latch controller may comprise an XNOR element. The latch controller is configured to assert an enable signal to the data latch when the second acknowledgment signal is received from the environment or a subsequent processing stage and to de-assert the enable signal when a first done signal is received from the data latch.

The data latch is configured to receive the data and the first request signal from the environment or a previous stage. The data latch has an enabled (i.e, transparent) phase and a disabled (i.e., opaque) phase responsive to the enable signal received from the latch controller. The data latch is enabled in the enabled phase to pass the data to a first data output, and the data latch is disabled in the disabled phase. The passing of the data to the first data output in the enabled phase also transmits a second request signal to the environment or a subsequent stage, transmits a first acknowledgment signal to the environment or a previous stage, and transmits the first done signal to the latch controller, Once a latch is enabled, and receives new data at its inputs (along with a request signal), it must remain transparent long enough for data to pass through. This operation requires a time constraint to be satisfied: The delay time comprising the receipt of first request signal to the transmitting of the first done signal $^t req_N - done_N$, the delay time associated with the XNOR element de-asserting the first enable signal, $^t XNOR_N1$, and the setup time of the data latch, $^t su$, are related by the following equation:

$$^treq_N - done_N + ^tXNOR_N1 > ^tsu.$$

The processing stage may further comprise a logic block configured to receive the data from the first data output, perform combinational logic on the data, and to transmit the data to the environment or a second processing stage, and a delay element configured to receive the first done signal from the data latch, apply a delay to the first done signal, and to transmit the delayed first done signal as the second request signal to the environment or a second processing stage. The second processing stage, if it appears in the design, also comprises a latch controller and a data latch. The second processing stage may also comprise a logic block and a delay element.

A second timing constraint should be met to ensure data is captured by a stage before new data is produced by the previous stage, as follows: the delay time of the first data latch, $^tLt_{N-1}$, the delay time of the first logic block, $^tlogic_{N-1}$, the time to enable the first data latch, $^tXNOR_{N-11}$, the time to disable the second data latch, $^tXNOR_{N1}$, and a hold time, $t_{hold}$, are related by the following equation:

$$^tLt_{N-1} + ^tlogic_{N-1} > (^tXNOR_{N1} - ^tXNOR_{N-11}) + t_{hold}.$$

In a further embodiment, the asynchronous pipeline may be used with wide datapaths. In another embodiment, the asynchronous pipeline may further comprise a fork, wherein a single processing stage provides data to two subsequent processing stages in parallel, or a join, wherein a single processing stage receives data from two previous processing stages in parallel.

In accordance with the invention, the objects as described above have been met, and the need in the art for a digital pipeline circuit having high throughput and low overhead has been satisfied. Further features of the invention, its nature and various advantages will be more apparent from the accompanying drawings and the following detailed description of illustrative embodiments.

BRIEF DESCRIPTION OF THE DRAWINGS

FIGS. 13–14 are detailed views of a portion of the pipeline illustrated in FIG. 12 in accordance with the invention.

DETAILED DESCRIPTION OF THE EXEMPLARY EMBODIMENTS

The pipelines in accordance with the invention are designed to provide extremely high throughput. In particular, while these pipelines can be applied to coarse-grained pipelines, they are especially suitable to fine-grained, or 'gate-level,' pipelines, where each stage is only one gate deep. At this granularity, the shortest cycle times are obtained: the critical cycle consists of a single logic gate plus a small amount of control logic (e.g., 2–3 component delays). As an additional optimization, the critical cycle is further shortened by merging logic and storage elements, using a circuit style called clocked-logic, or clocked-CMOS ($C^2MOS$), as will be described in greater detail below. This technique has the benefit of reduced critical delays, smaller chip area and lower power consumption. In each case, a highly concurrent protocol is used; as a result, a basic FIFO pipeline in accordance with the invention has a cycle time of only 5–6 CMOS gate delays (3–4 components). The pipelines in accordance with the invention are "Minimal Overhead Ultra-high-SpEed TRansition-signaling Asynchronous Pipeline," also referred to as MOUSETRAP pipelines.

Figure 2:
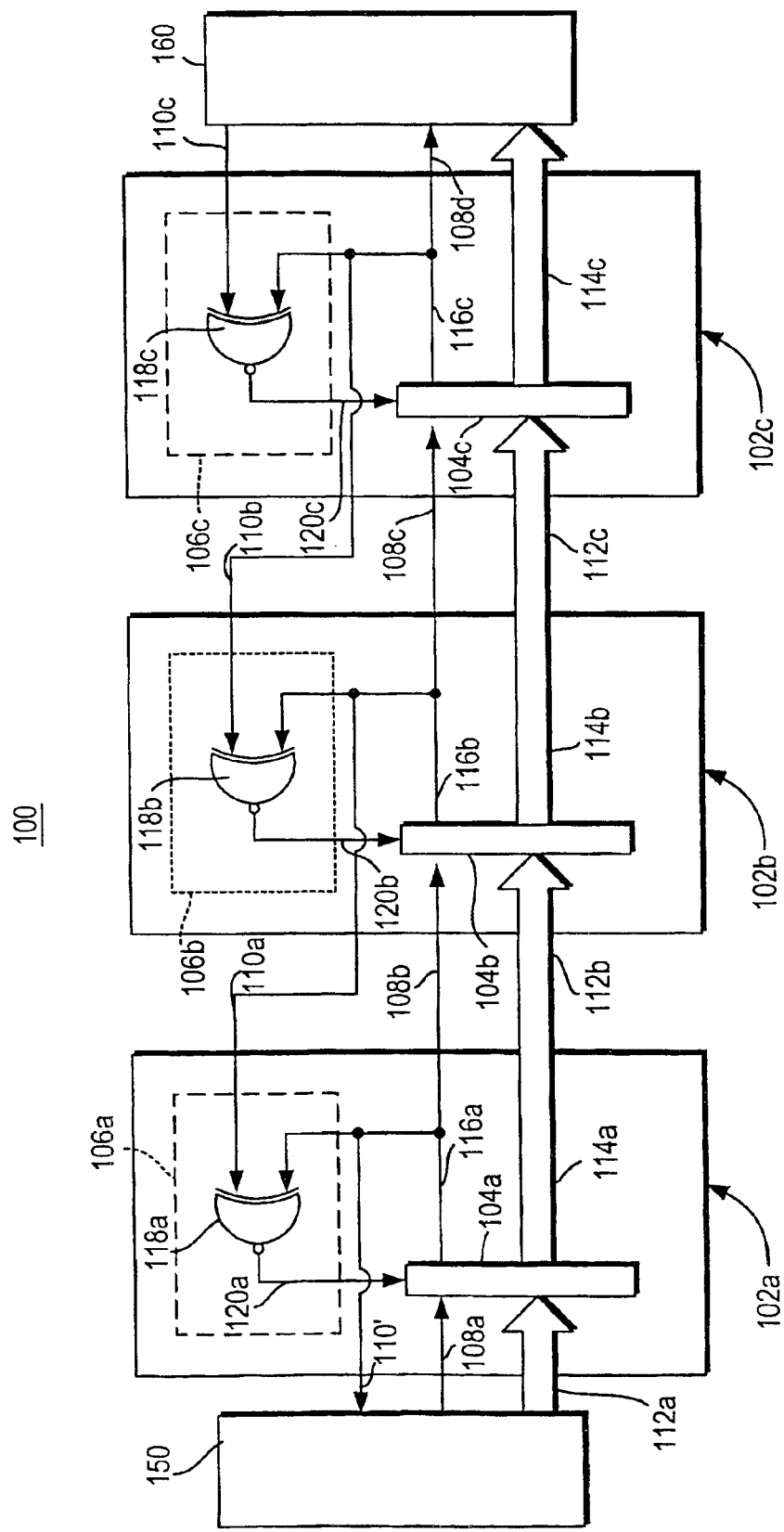
FIG. 2 is a schematic view of a first embodiment of a pipeline in accordance with the invention.

FIG. 2 illustrates the structure of the basic pipeline 100 without logic processing. An asynchronous, or clockless, circuit style was chosen for several reasons. First, while synchronous designers are currently capable of achieving multi-GigaHertz clock distributions, the task involves the ever-increasing challenges of design time, verification effort, clock skew and clock power management, and interfacing with different timing domains. Second, since an asynchronous pipeline has no global clock, it has a natural elasticity, i.e., the number of data items in the pipeline is allowed to vary, and the speeds at each interface can vary. As a result, the pipeline can interface with varied environments operating at different rates, thus facilitating modular and reusable design. Finally, the localized control of asynchronous pipelines is an excellent match for very high throughput fine-grain datapaths.

The pipeline 100 interacts with the "left" environment 150 and the "right" environment 160. (Although the left environment and the right environment are not pictured in subsequent drawings for clarity, it is noted signals received by or sent from the stages at the extreme ends of the figures are received from or sent to the environment. Moreover the structure of pipeline 100 is applicable to a single stage interacting between a left environment and a right environment, or generally, "the environment.") The new pipeline is characterized by simplicity of its structure and operation, as well as by ease of design. The datapath uses standard transparent latches which are small and fast, and the control consists of only a single gate per pipeline stage. Three pipeline stages are shown, i.e., Stage N−1 102a, Stage N 102b, and Stage N+1 102c. Each stage 102a, 102b, 102c comprises a data latch 104a, 104b, 104c and a latch controller 106a, 106b, 106c. Pipeline stages communicate only with immediate neighbors, and the timing constraints are local, simple and one-sided, as will be described in greater detail herein.

The stages 102a, 102b, 102c communicate with each other using signals, i.e., "requests" $req_{N-1}$ 108a, $req_N$ 108b, $req_{N+1}$ 108c and "acknowledgments" $ack_{N-1}$ 110a, $ack_N$ 110b, $ack_{N+1}$ 110c. (Request $req_{N-1}$ 108a is received from the left environment 150, and request $req_{N+2}$ 108d is passed to the right environment 160. Similarly, acknowledgment $ack_{N-2}$ 110' is passed to the left environment 150, and acknowledgment $ack_{N+1}$ 110c is received from the right environment 160.)

Figure 3A:
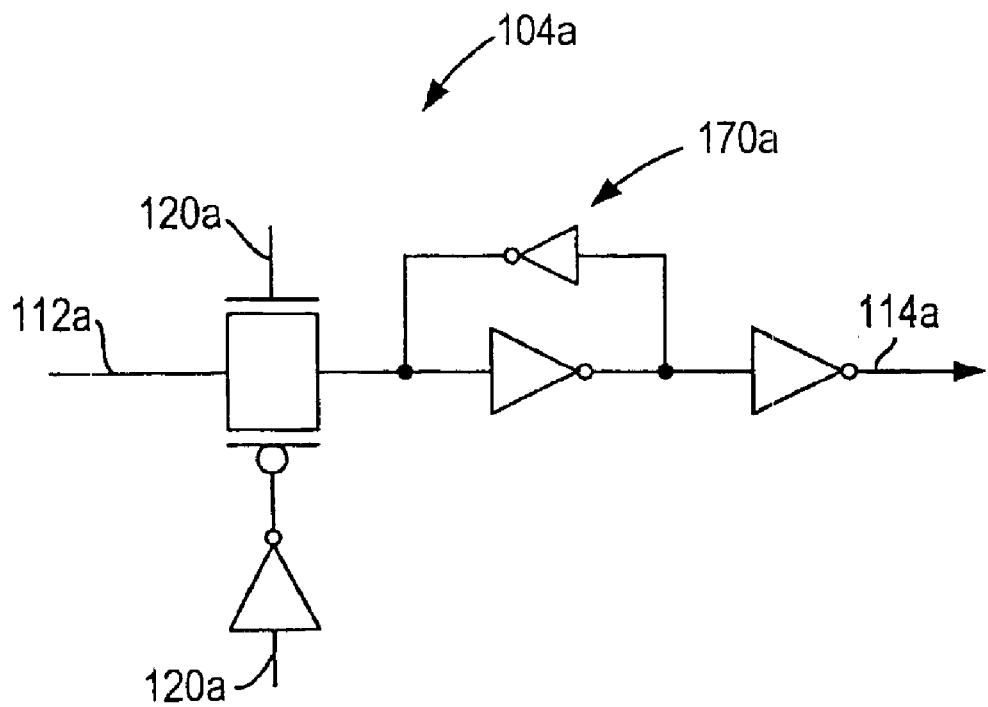
FIG. 3(a) is a more detailed schematic view of a portion of the pipeline of FIG. 2 in accordance with the invention.
Figure 3B:
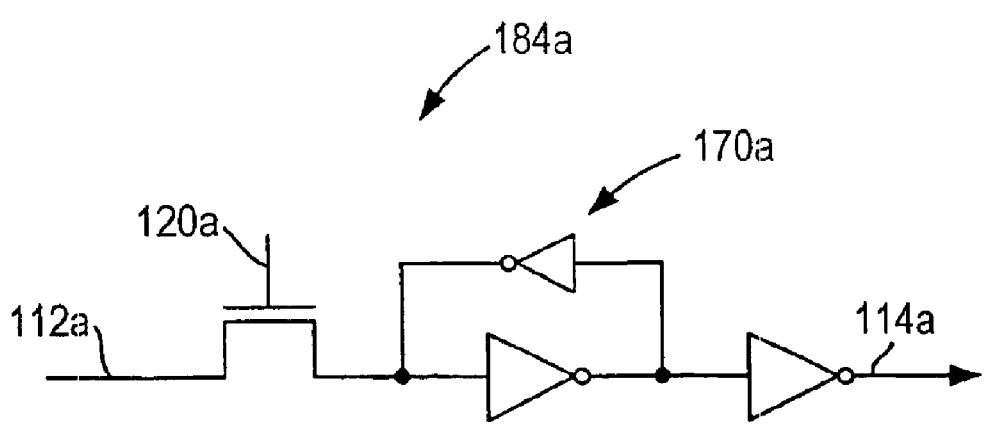
FIG. 3(b) is another embodiment of the portion of the pipeline illustrated in FIG. 3(a) in accordance with the invention.

The data latch 104a, 104b, 104c is a simple latch, which is normally transparent, i.e., "enabled," which allows new data arriving at a respective data input 112a, 112b, 112c to pass through quickly to data output 114a, 114b, 114c, as illustrated in FIG. 3(a). (Data input 112a is received from the left environment 150, and data output 114c is passed to the right environment 160. The latch 104a is enabled and disabled by latch enable signal 120a. The latch 104a typically includes an inverter pair 150.) The data latches 104a, 104b, 104c also produce the "done" signal $done_{N-1}$ 116a, $done_N$ 116b, $done_{N+1}$ 116c which are latched versions of inputs $req_{N-1}$ 108a, $req_N$ 108b, $req_{N+1}$ 108c, respectively, when the respective stage 102a, 102b, 102c has latched the new data. One individual latch is used for each data bit, and one latch is used to generate the done signal for each stage. FIG. 3(a) illustrates latch 104a, which has been optimized for increased noise immunity. FIG. 3(b) illustrates another embodiment of a latch 184a, which has been optimized for reduced delay.

A commonly-used asynchronous scheme, called "bundled data," is used to encode the datapath. (Further details of bundled data are provided in C. L. Seitz, "System timing," *Introduction to VLSI Systems*, chapter 7. (C. A. Mead et al., eds., Addison-Wesley 1980), and A. Davis et al., "Asynchronous Circuit Design: Motivation, Background and Methods," *Asynchronous Digital Circuit Design*, (G. Birtwistle et al., eds., Workshops in Computing, Springer-Verlag, 1995) pp. 1–49, both of which are incorporated by reference in their entirety herein.) According to the bundled-data scheme, the request control signal, $req_N$ 108b must arrive at stage N 102b after the data inputs 112b have stabilized. (If the data has to go through a logic block before arriving at stage N 102b, then $req_N$ 108b must be appropriately delayed. This is discussed in greater detail below.) Once stage N 102b has latched the new data, done signal $done_N$ 116b is produced, which is sent to its latch controller 106b, as well as to Stage N−1 102a as acknowledgment signal $ack_{N-1}$ 110a, and to Stage N+1 102c as request signal $req_{N+1}$ 108c.

The latch controller 106a, 106b, 106c enables and disables the respective data latch 104a, 104b, 104c with enable signal $En_{N-1}$ 120a, $En_N$ 120b, $En_{N+1}$ 120c. It comprises an exclusive NOR gate, i.e., XNOR gate 118a, 118b, 118c, having two inputs: the done signal from the current stage, and the acknowledgment signal from the subsequent stage. For example, XNOR gate 118b receives $done_N$ 116b from Stage N 102b, and $ack_N$ 110b from Stage N+1 102c.

The operation of the pipeline 100 of FIG. 2 is described herein. Initially, when the pipeline 100 is empty, all the latches 104a, 104b, 104c are transparent and all done signals $done_{N-1}$ 116a, $done_N$ 116b, $done_{N+1}$ 116c; all request signals $req_{N-1}$ 110a, $req_N$ 108b, $req_{N+1}$ 108c; and all acknowledgment signals $ack_{N-1}$ 110a, $ack_N$ 110b, $ack_{N+1}$ 110c are low. The pipeline 100 uses the commonly-known method of signaling referred to as "transition signaling." Thus, when the first data items flows through successive stages of the pipeline, it flips the values of all these signals exactly once (e.g., high). Subsequently, the second data item flips all these signals once again (e.g., low). Each transition, whether up or down, represents a distinct event, i.e., the arrival of a new data item.

Once a data item passes through a stage's latch, three actions take place in parallel: (i) the data is passed forward from that stage to the subsequent stage for further processing, along with the corresponding request signal; (ii) an acknowledgment signal is sent from the stage to the previous stage, freeing it up to process the next data item; and finally (iii) the stage's latch itself is quickly closed (i.e., made opaque) to protect the current data from being overwritten by new data produced by the previous stage. Subsequently, when an acknowledgment signal is received by the stage from the subsequent stage, the latch in the stage is re-enabled (i.e., made transparent). For example, once a data item passes through the latch 114b of stage N 102b's, the following actions occur in parallel: (i) the data and the corresponding request $req_{N+1}$ 108c are passed forward to stage N+1 102c for further processing; (ii) an acknowledgment, $ack_{N-1}$ 110a, is sent to stage N−1 102a; and (iii) latch 114b of stage N 102b is closed to protect the current data from being overwritten by new data produced by stage N−1 102a. Subsequently, the latch 114b in stage N 102b is re-enabled when an acknowledgment, $ack_N$, 110b is received from stage N+1 102c.

While the flow of data uses transition signaling, i.e., one transition on each req/done/ack per data item, as described above, the latches 104a, 104b, 104c require two transitions per data item: (i) one to capture data (make opaque) and (ii) one to release data (make transparent). The latch controller 106a, 106b, 106c controls the respective latch 104a, 104b, 104c based on the following inputs: done signals and acknowledgment signals. For example, the first transition in stage N 102b takes place when data passes through the latch 104b (i.e., the done signal $done_N$ 116b changes value); and the second transition in stage N 102b takes place when the same data passes through the subsequent stage, stage N+1 102c (i.e., the acknowledgment signal $ack_N$ 110b changes value). Thus, the XNOR gate 118a, 118b, 118c of each latch controller 106a, 106b, 106c acts like a phase converter, in the sense that it converts the transition signaling done signals and acknowledgment signals into level control for the transparent latches.

The latch controller 104a, 104b, 104c, including the XNOR gate 118a, 118b, 118c, respectively, has been configured to act as an "equality tester." When two consecutive stages, e.g., stage N 102b and stage N+1 102c, have the same data item, the first stage, i.e., stage N 102b, is considered effectively "empty" by the latch controller, and its latch is enabled (i.e., made transparent). When the consecutive stages have distinct data items, the first stage, i.e., stage N 102b, is considered effectively "full" by the latch controller, and its latch is disabled (i.e., made opaque). The data of N and N+1 are compared by the XNOR which examines if the phases of the two data requests (116b and 110b) are the same; if they are, then the latch is enabled (i.e., remain transparent), if not, the latch is closed (i.e., made opaque).

Thus, the latching action by a pipeline stage is broadly analogous to the operation of a household mousetrap, in the sense that latches are enabled (i.e., remain transparent) before data arrives. Subsequently, the latches are closed (i.e., made opaque) as soon as data passes through. This behavior is distinguished from that of most synchronous, and many asynchronous, pipelines in which latches are opened only after new data arrives.

A local timing constraint must be satisfied for correct operation. Since a transition on done signal $done_N$ 116b is also a transition on acknowledgment signal $ack_{N-1}$ 110a, there is a "race" condition between the disabling of latch 104b of stage N 102b and the reception of new data from stage N−1 102a. To ensure that the contents of stage N 102b are not corrupted, latch 104b of stage N 102b must be disabled "fast enough," i.e., before the stage N−1 102a can provide new data. This is a simple one-sided timing constraint that can easily be satisfied in practice, as is described in greater detail below.)

The choice of a hybrid protocol—transition signaling for the handshake signals, and level signaling for the latch enable signal—provides the advantages of both signaling schemes. First, there is significantly less handshaking overhead since there is no wasteful "return-to-zero" phase. Second, small and fast transparent latches may be used, since they are level-controlled. Several transition signaling schemes have already been proposed. Some of these schemes have phase conversion (e.g., I. E. Sutherland, "Micropipelines," *Communications of the ACM*, 32(6) :720–738, June 1989., and P. Day et al., "Investigation Into Micropipeline Latch Design Styles," *IEEE TVLSI*, 3(2) :264–272, June 1995, both of which are incorporated by reference above), and others schemes have no phase conversion (For example, K. Yun et al., "High-Performance Asynchronous Pipelines Circuits," *Proc. Intl. Symp. Adv. Res. Async. Circ. Syst. (ASYNC)*, 1996, which is incorporated by reference in its entirety herein). However, the pipeline 100 discussed herein has much less overhead, as described herein.

As described above, the pipeline protocol in accordance with the invention is very simple, and the resulting operation quite fast. The forward latency of an empty pipeline is low because all the latches are initially transparent. The cycle time of the pipeline is short because the pipeline is highly concurrent: as soon as data enters stage N, stage N−1 is freed up for its entire next cycle.

In other embodiments of the pipeline, logic processing can be added to the pipeline. First, a basic implementation with explicit latches is disclosed as a second embodiment. Then as a third embodiment, gate-level pipelines are considered in which each stage is only a single gate deep, with no explicit latches.

Figure 4:
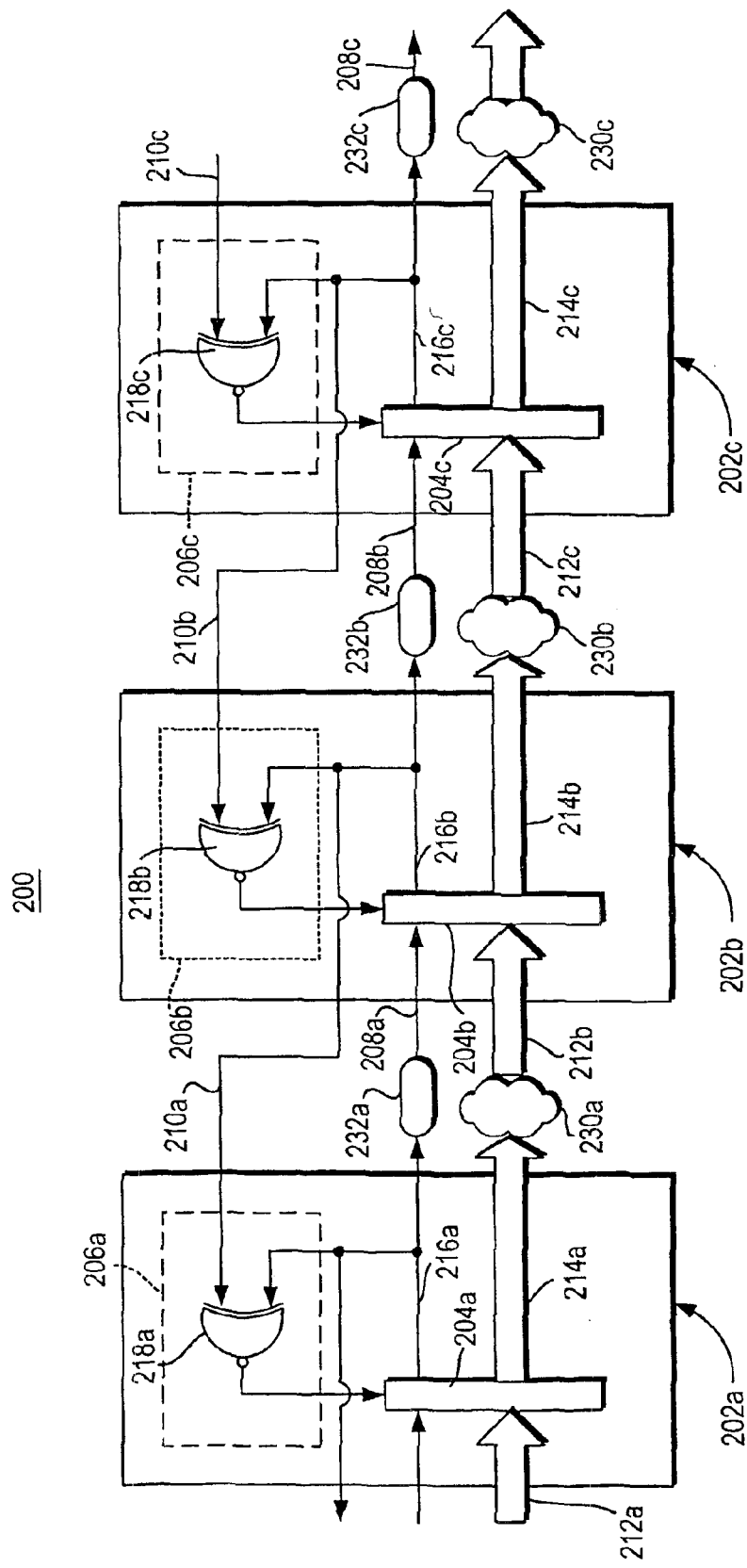
FIG. 4 is a schematic view of a second embodiment of a pipeline in accordance with the invention.

FIG. 4 illustrates a second embodiment of the pipeline, referred to as pipeline 200, in which logic processing has been added. Pipeline 200 is substantially identical to pipeline 100, with the differences noted herein. As with pipeline 100, pipeline 200 has several stages, i.e., stage N−1 202a, stage N 202b, and stage N+1 202c. As with pipeline 100, each stage 202a, 202b, 202c comprises a data latch 204a, 204b, 204c and a latch controller 206a, 206b, 206c. The latch controller 206a, 206b, 206c comprises and XNOR element 218a, 218b, 218c. In pipeline 200, blocks of combinational logic 230a, 230b, 230c and matching delay elements 232a, 232b, 232c are inserted between adjacent pipeline stages. For example, if a stage implements a 32-bitwise OR function on two 32-bit operands, $A_0 \ldots A_{31}$ and $B_0 \ldots B_{31}$, then the logic would consist of 32 two-input OR gates computing $A_0+B_0$, $A_1+B_1$, etc. The datapath for a stage, e.g., stage N–1 202a, comprises the passage of data from the data input 212a through latch 204a to data output 214a, and through combinational logic 230a to data input 212b for the next stage, e.g., stage N 202b. The stages 202a, 202b, 202c communicate with each other using signals, i.e., "done" $done_{N-1}$ 216a, $done_N$ 216b, $done_{n+1}$ 216c; "requests" $req_{N-1}$ 208a, $req_N$ 208b, $req_{N+1}$ 208c; and "acknowledgments" $ack_{N-1}$ 210a, $ack_N$ 210b, $ack_{N+1}$ 210c. (The delay of the matched delay element 232a, 232b, 232c is applied to the done signal 216a, 216b, 216c to produce the corresponding request signal 208a, 208b, 208c.) The standard asynchronous "bundled-data" scheme referenced above is also used in pipeline 200. As with pipeline 100, the request signal $req_N$ 208a must arrive at stage N 202b after the data inputs 212b to that stage have stabilized. Therefore, the latency of the delay element 232a must match the worst-case delay through the combinational block 230a. An advantage of this approach is that the datapath itself can use standard single-rail (synchronous style) blocks, which are allowed to be hazardous, that is, transient glitches on the data inputs 212b are allowed, as long the req signal arrives after data has stabilized.

There are several common ways to implement a matched delay element 232a, 232b, 232c. A preferred technique is to use an inverter chain. Alternatively, a chain of transmission gates are used; as is well-known, the number of dates and their transistor sizing determines the total delay. Another preferred technique duplicates the worst-case critical paths of the combinational logic block 230a, 230b, 230c, and uses that as a delay line (Further details of such delay elements are described in S. Furber, "Computing Without Clocks: Micropipelining the ARM Processor," *Asynchronous Digital Circuit Design, Workshops in Computing* (eds. G. Birtwistle et al.), Springer-Verlag, 1995, pp. 211–262 and S. M. Nowick et al., "Speculative Completion for the Design of High-Performance Asynchronous Dynamic Adders, *Proc. Intl. Symp. Adv. Res. Async. Circ. Syst.*, IEEE Computer Society Press, April 1997, pages 210–223, which are incorporated by reference in their entirety herein.) If the duplicated critical path is placed in close proximity to the logic block, it can provide good delay tracking even for a wide variation in environmental and process variations. However, this technique is more area-expensive than using a chain of inverters or other standard gates. Bundled data has been widely used, including in a commercial Philips 80C51 asynchronous microcontroller (further details are described in H. v. Gageldonk et al., "An Asynchronous Low-Power 80C51 microcontroller, *Proc. Intl. Symp. Adv. Res. Async. Circ. Syst.* (*ASYNC*), 1998, pp. 96–107, which is incorporated by reference in its entirety herein).

In accordance with a third embodiment, a goal of extremely high throughput may be achieved by "gate-level pipelines." In this embodiment, the datapath is sectioned into the finest-grained stages, each comprising a single level of logic with no explicit latches. As an additional benefit, the absence of latches provides savings of chip area and power consumption.

Figure 5:
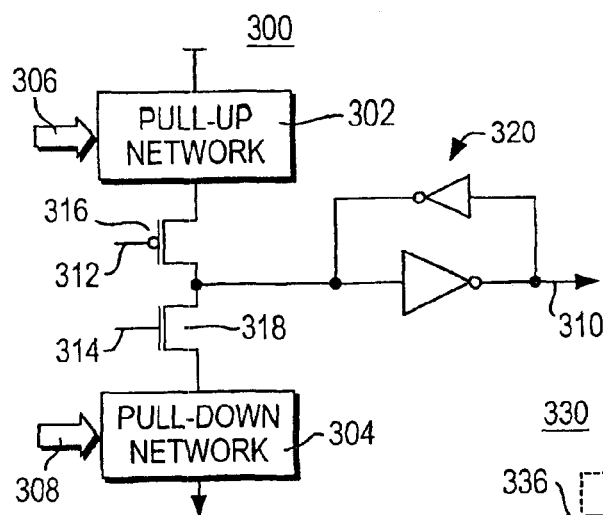
FIGS. 5–7 are schematic views of a prior art logic gate structure.
Figure 6:
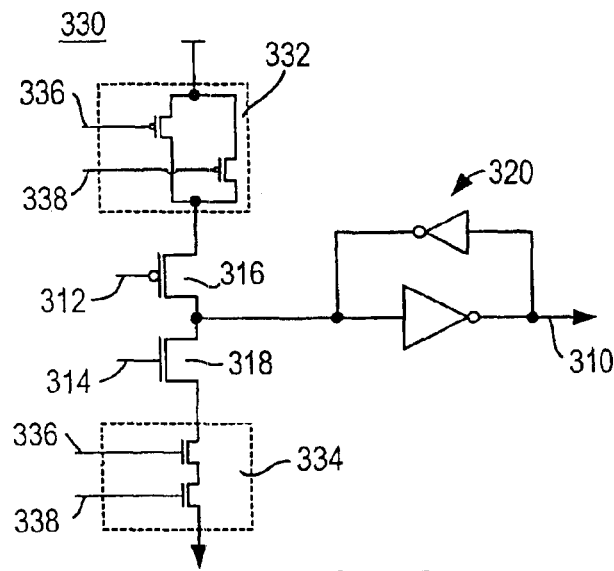
Figure 7:
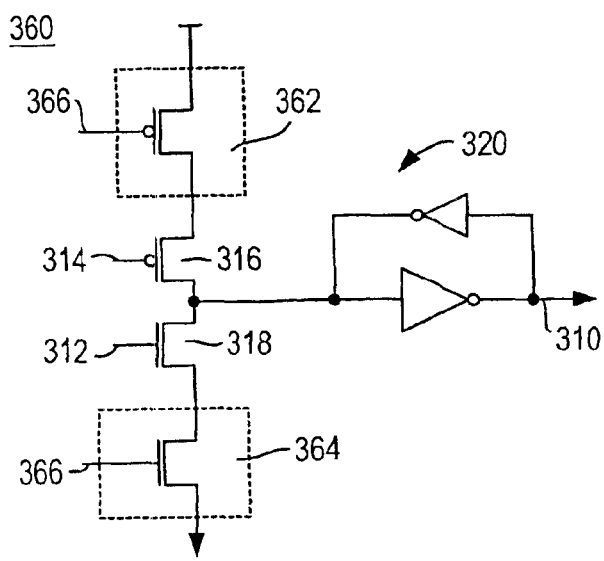

"Clocked-logic," also known as "clocked-CMOS" or "$C^2MOS$," is a particularly attractive approach to gate-level pipelining. (Further details of clocked CMOS circuitry are described in M. Borah et al., "High-Throughput and Low-Power DSP Using Clocked-CMOS Circuitry, *Proc. Intl. Symp. out Low-Power Design,* 1995, pp.139–144, which is incorporated by reference in its entirety herein.) In the $C^2MOS$ scheme, separate, explicit latches are eliminated. Instead, a clock is applied directly to the logic gate. FIGS. 5–7 illustrate the structure of several exemplary $C^2MOS$ gates. For example, FIG. 5 illustrates a generalized $C^2MOS$ gate 300, having a pull-up network 302 and a pulldown network 304, and logic inputs 306 and 308, and logic output 310. The clock input, En 312, directly controls the gate 300 through two transistors, one transistor 316 in the pull-up network 302 and one transistor 318 in the pull-down network 304. When En 312 is de-asserted (i.e., its complement $\overline{En}$ 314 is asserted), the gate 300 holds its output value at output 310. Typically, an inverter pair 320 providing weak feedback is attached at the gate output 310 to provide a more robust hold operation. Similarly, FIG. 6 illustrates a $C^2MOS$ AND gate 330, having pull-up network 332 and pull-down network 334 which provide AND functionality to input A 336 and input B 338. FIG. 7 illustrates a $C^2MOS$ latch 360, having pull-up network 362 and pull-down network 364, which acts as an identity gate for input A 366. The $C^2MOS$ scheme has previously been proposed in the art as a synchronous technique. However, it has been adapted in accordance with the invention to very high-speed asynchronous pipelines using handshaking signals to replace the clock, as will be described in greater detail below.

Figure 8:
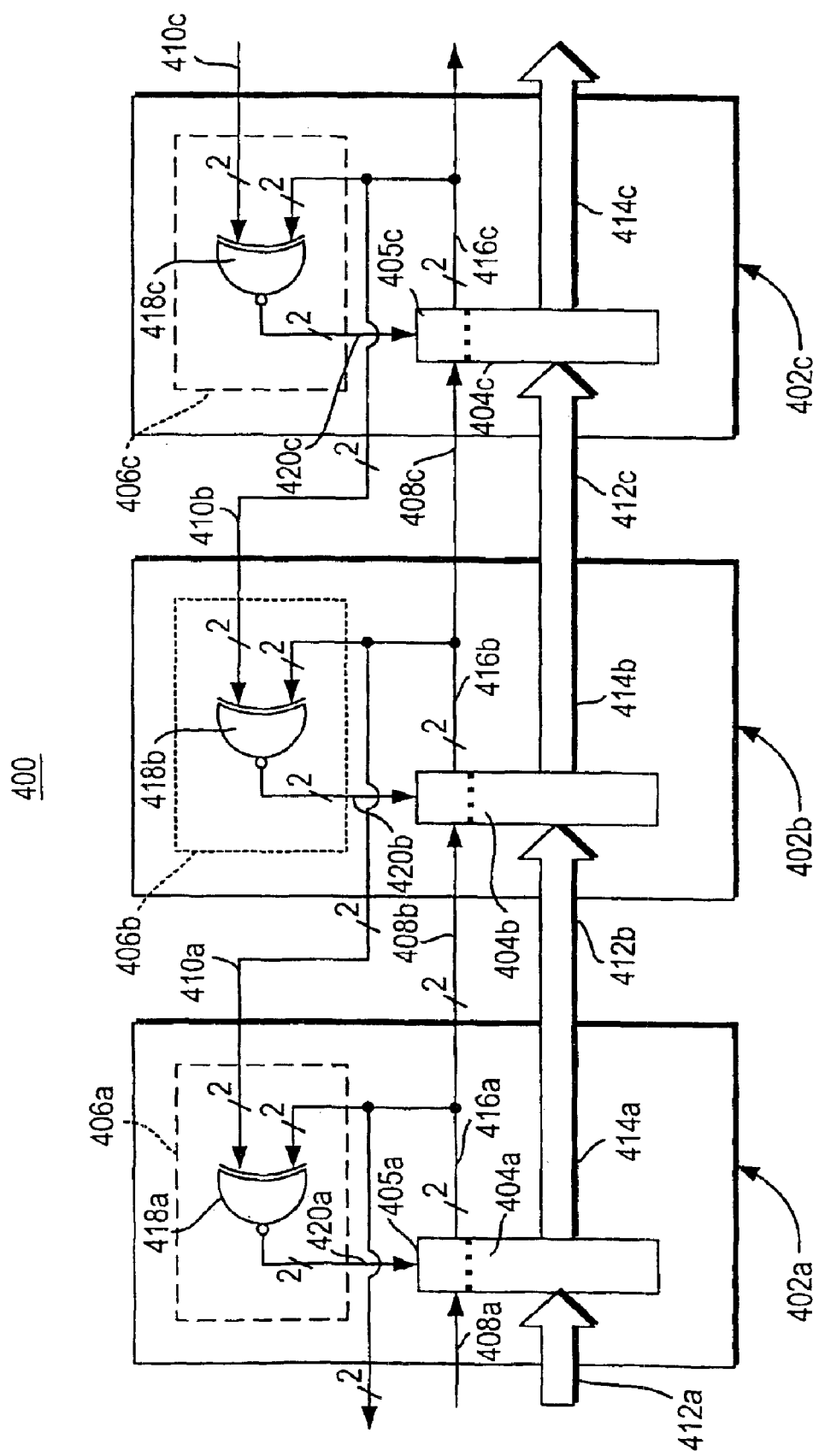
FIG. 8 is a schematic view of a third embodiment of a pipeline in accordance with the invention.

FIG. 8 illustrates pipeline 400, which is a $C^2MOS$ implementation of the pipeline in accordance with the invention. Pipeline 400 is substantially identical to pipelines 100 and 200, with the substantial differences noted herein. As with pipelines 100 and 200, pipeline 400 has several stages, i.e., stage N–1 402a, stage N 402b, and stage N+1 402c. In contrast to pipelines 100 and 200, explicit data latches have been eliminated. However, each stage 402a, 402b, 402c has a "latch" controller 406a, 406b, 406c which provides control of the $C^2MOS$ gates 404a, 404b, 404c respectively. Each of gates 404a, 404b, 404c may include appropriate combinational logic, such as gate 300 (illustrated in FIG. 5), gate 330 (illustrated in FIG. 6), and gate 360 (illustrated in FIG. 7).

A pair of identity gates 405a, 405b, 405c are used in pipeline 400, and are substantially identical to gate 360, and implemented as described herein. A first identity gate is used in which the request signal is the input and the done signal is the output. A second identity gate is used in which the complement of the request signal is the input, and the complement of the done signal is the output. More particularly, the enable signal and its complement 420a, 420b, 420c, illustrated in FIG. 8, correspond to the enable signal En 314 and its complement $\overline{En}$ 312 in FIG. 8. In the first of the two identity gates, the request signal $req_{N-1}$ 408a, $req_N$ 408b, $req_{N+1}$ 408c and the done signal $done_{N-1}$ 416a, $done_N$ 416b, $done_{N+1}$ 416c of FIG. 8 correspond to the input signal 366 and the output signal 310 of FIG. 7, respectively. In the second of the two identity gates, the complement of the request signal $\overline{req}_{N-1}$ 408a, $\overline{req}_N$ 408b, $\overline{req}_{N+1}$ 408c is the input signal 366 and the complement of the done signal $\overline{done}_{N-1}$ 416a, $\overline{done}_N$ 416b, $\overline{done}_{N+1}$ 416c is the output signal 310. The datapath for a stage, e.g., stage N–1 402a, comprises the passage of data from the data input 412a, through $C^2MOS$ gate 404a to data output 414a, and to data input 412b for the next stage, e.g., stage N 402b. $C^2MOS$ gates 404a, 404b, 404c provide both logic as well as latching functionality.

The "clock" input for the C²MOS gates described above with respect to FIGS. 5–7 is actually the locally generated En signal, i.e., the output of the latch controller. For pipeline 400, illustrated in FIG. 8, the enable signal En and its complement $\overline{En}$ 420a, 420b, 420c are the output of latch controller 406a, 406b, 406c. Both enable signal En and $\overline{En}$ are used for the control of the C²MOS gates 404a, 404b, 404c.

Since control of the C²MOS gates 404a, 404b, 404c uses both true and complemented enables En and $\overline{En}$, the XNOR 418a, 418b, 418c of latch controller 406a, 406b, 406c is implemented as a monotonic dual-rail gate, providing both exclusive OR, i.e., XOR, and exclusive NOR, i.e., XNOR, outputs. (The dual-rail signals are indicated in FIG. 8, by a slash "/" and number "2," as is known in the art.) The stages 402a, 402b, 402c communicate with each other using signals, i.e., "done" done$_{N-1}$ 416a, done$_N$ 416b, done$_{N+1}$ 416c; "requests" req$_{N-1}$ 408a, req$_N$ 408b, req$_{N+1}$ 408c; and "acknowledgments" ack$_{N-1}$ 410a, ack$_N$ 410b, ack$_{N+1}$ 410c, as with pipeline 100, above. However, the XNOR 418a, 418b, 418c is configured to have two dual-rail inputs—(done, $\overline{\text{done}}$) and (ack, $\overline{\text{ack}}$)—and a dual-rail output (En, $\overline{En}$). While this approach increases the overall control area, it directly improves the performance: two inverters are eliminated from the critical cycle (from XNOR inputs and its output).

Figure 9:
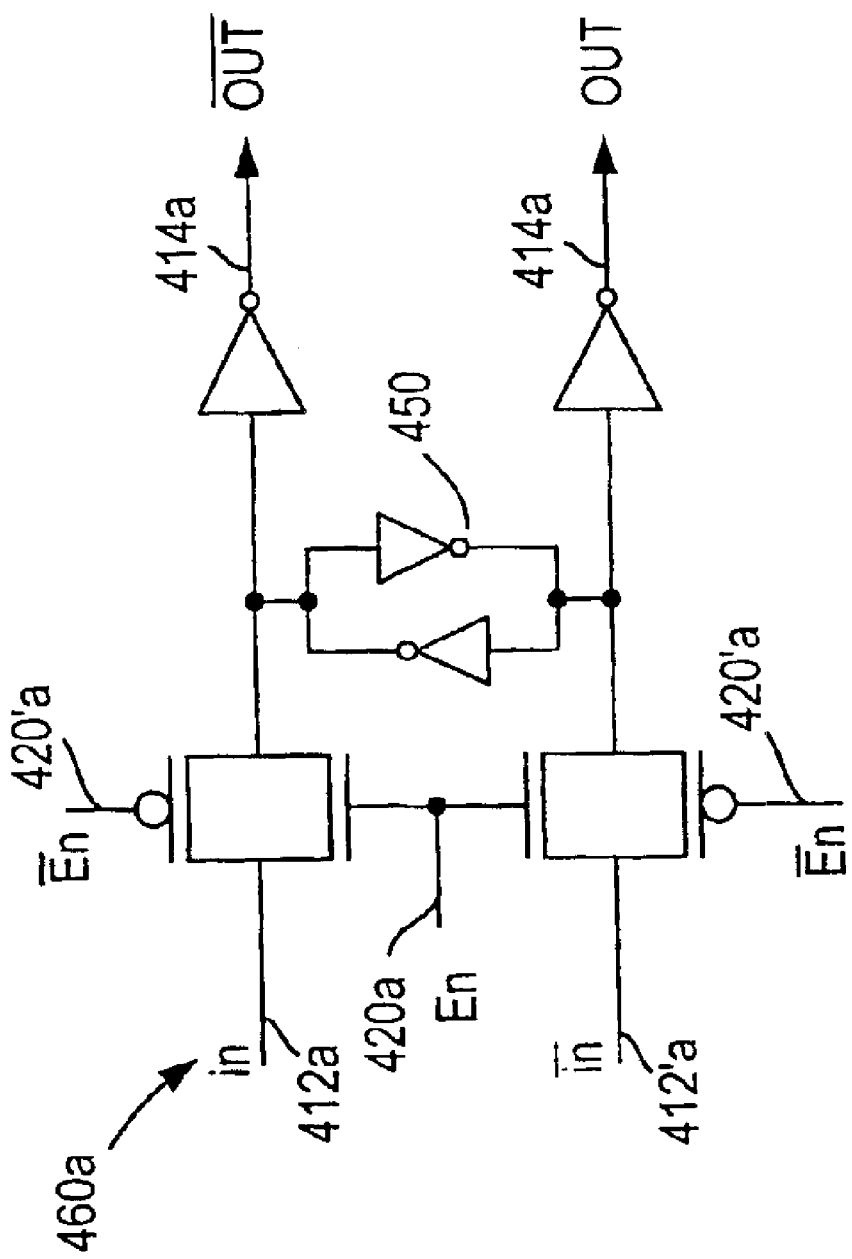
FIG. 9 is a more detailed schematic view of a portion of the pipeline of FIG. 8 in accordance with the invention.

An optimized version of a dual-rail latch 460a is illustrated in FIG. 9, which replaces the pair of identity gates 405a described above. Accordingly, latch 460a receives dual-rail data input in 412a and its complement $\overline{\text{in}}$ 412'a, and latch enable En 420a and its complement $\overline{En}$ 420'a, and produces dual-rail data output out 414a and its complement out 414'a. The single dual-rail latch 460a has a smaller area and also lessens skew between the dual-rail outputs.

An analytical evaluation of both pipeline performance and timing constraints is described herein. Two key measures of the performance of the pipeline are discussed: forward latency and cycle time.

First, forward latency is the time it takes a data item to pass through an initially empty pipeline. Since all the latches of an empty pipeline are transparent, the pipeline latency per stage, L, is simply the stage's latch delay, $t_{Lt}$, plus logic delay, $t_{logic}$:

$$L = t_{Lt} + t_{logic} \quad [1]$$

In contrast to the Sutherland and Day/Woods designs, described above, the pipeline in accordance with the invention has only a single latch delay for the first path, and only an XNOR delay for the second path. In contrast to the Furber and Day pipeline, described above, the pipeline in accordance with the invention only has 3 components on the critical cycle (2 D-latches and an XNOR), no stack depths of 3, no implied inverters, and avoids the extra switching activity of 4-phase communication.

Second, cycle time is the time interval between successive data items emerging from the pipeline when the pipeline is operating at maximum speed. A cycle of stage N, from one enabling of its latch to the next, consists of three events: (i) new data passes through the latch and the stage's logic block, i.e., $t_{Lt}+t_{logic}$, (ii) the data passes through stage N+1's latch, i.e., $t_{Lt}$, producing ack$_N$, and (iii) ack$_N$ causes stage N's latch controller to re-enable stage N's latch, i.e., $t_{XNOR1}$. Therefore, the analytical cycle time T is:

$$T = t_{Lt} + t_{logic} + t_{Lt} + t_{XNOR1} \quad [2]$$

$$= 2 \cdot t_{Lt} + t_{logic} + t_{XNOR1} \quad [3]$$

where $t_{logic}$ is the delay through the logic block, and $t_{XNOR1}$ is the time it takes the XNOR gate to enable the latch.

The above performance measures apply to pipelines 100, 200, and 400. For the case of C²MOS pipelines, such as pipeline 400, there are no explicit latches. If the delay through a C²MOS gate is denoted by $^tC^2MOS$, the latency and the cycle time are given by:

$$^LC^2MOS = {^tC^2MOS} \quad [4]$$

$$^TC^2MOS = 2 \cdot {^tC^2MOS} + t_{XNOR1} \quad [5]$$

As will be described in greater detail below, the cycle times of Equations 3 and 5 are quite good, and would be difficult to surpass with synchronous schemes. For example, a standard synchronous pipeline, with alternating latches controlled by complementary clocks, and with logic between every adjacent latch pair, will have a cycle time of at least $2 \cdot t_{Lt} + t_{logic}$, plus adequate margins to compensate for clock skew and jitter.

Two simple one-sided timing constraints must be satisfied for the correct operation of the pipeline: setup time and data overrun. With regard to setup time, once a latch is enabled and receives new data at its inputs (along with a req signal), it must remain transparent long enough for data to pass through. Thus, the path from req$_N$ to En de-asserted (XNOR switching low) must be longer than the setup time of the latch, $^tsu$, where setup time is the additional delay required after enabling the latch and before the latch may be disabled:

$$^treq_N - done_N + {^tXNOR_N 1} > {^tsu} \quad [6]$$

This constraint is easily satisfied because the delay from req$_N$ from done$_N$ typically exceeds the setup time, $^tsu$.

It is noted that the XNOR element of the latch controller may be substituted with similar logic, in which case the delay time associated with de-asserting the first enable signal is $^tLC_N 1$, and the one-side timing constraint is expressed more generally as:

$$^treq_N - done_N + {^tLC_N 1} > {^tsu} \quad [6a]$$

The constraint of equations [6] and [6a] is easily satisfied because the delay from req$_N$ from done$_N$ typically exceeds the setup time, $^tsu$.

With regard to data overrun, once data enters a stage, it should be securely captured before new data is produced by the previous stage. If this condition is violated, stage N's data will be overwritten by new data. Therefore, since ack$_{n-1}$ and done$_n$ are generated in parallel, the path from ack$_{n-1}$ to stage N's data inputs must be longer than the time to close N's latch, plus a hold time, $t_{hold}$, where hold time is defined herein as the delay required after disabling a latch before it is safely immune to changes in the latch's data inputs:

$$^tXNOR_{N-11} + {^tLt_{N-1}} + {^tlogic_{N-1}} > {^tXNOR_{N1}} + {^thold} \quad [7]$$

The left terms represent the shortest path through the XNOR to the arrival of new input from stage N−1, i.e., including the latch delay and the logic delay for stage N−1, if present in the pipeline. The right terms represent the path to disabling stage N's latch. The equation can be rewritten to simplify the constraint:

$$^tLt_{N-1} + {^tlogic_{N-1}} > ({^tXNOR_{N1}} - {^tXNOR_{N-11}}) + t_{hold} \quad [8]$$

Assuming $^tXNOR_{N-11} \cong {^tXNOR_{N1}}$, the right expression in parentheses is cancelled. The result is simple hold time constraint, which is easily satisfied because the latch and logic delays through stage N−1 usually exceed the hold time.

As with equation [6a] above, it is noted that the XNOR element in the latch controller may be substituted by similar logic, such that the rising transition time of the XNOR in the latch controller of stage N−1, $^rXNOR_{N-11}$, may be expressed more generally as the rising transition time of the latch controller of stage N−1, $^rLC_{N-11}$. Similarly, the falling transition time of the XNOR in the latch controller of stage N, $^fXNOR_{N1}$, may be expressed more generally as the falling transition time of the latch controller of stage N, $^fLC_{N1}$ The one-sided timing constraint of equation [8] may be expressed more generally as $$^fLt_{N-1} + ^flogic_{N-1} > (^fLC_{N1} - ^fLC_{N-11}) + t_{hold} \quad [8a]$$

An important consideration is the handling of very wide datapaths, where control signals must be broadcast across many latches. This control distribution may introduce sizable delays in the critical path, slowing down the operation of the pipeline. There are two practical solutions proposed herein for efficient pipelining of wide datapaths; (i) datapath partitioning, and (ii) control kiting.

According to the first approach, i.e., datapath partitioning, a wide datapath is divided into several smaller independent streams. The pipeline control is replicated for each stream, and each stream has its own sequence of completion generators and matched delays. As a result, the requirement of buffering is significantly reduced: in each stage, the latch controller generates a latch enable signal which is broadcast to only a small number of bits, i.e. to only those bits that lie inside that partition. This approach is typically applicable to bit-slice datapaths, such as plain FIFO's and logic function units (e.g. bitwise AND, OR, etc.).

The second approach to handling wide datapaths, referred to as control kiting, allows the datapath to be skewed with respect to the control (further details of control kiting is disclosed in K. Yun, P. Beerel, and J. Arceo, "High-Performance Asynchronous Pipelines Circuits, *Proc. Intl. Symp. Adv. Res. Async. Circ. Syst. (ASYNC)*, 1996.; and C. Molnar, I. Jones, W. Coates, J. Lexau, S. Fairbanks, and I. Sutherland, "Two FIFO Ring Performance Experiments," *Proceedings of the IEEE*, 87(2):297–307, February 1999, both of which are incorporated by reference in their entirety herein). In contrast with the first approach, no partitioning is used; instead, buffers are inserted to adequately amplify the latch enable signals which drive the datapath latches. However, the latch enable signals for the completion generators do not need this amplification; they are simply tapped off from before the buffers. As a result, much of the overhead of broadcasting the latch enable to the datapath is hidden, occurring in parallel with other pipeline operations.

Figure 10:
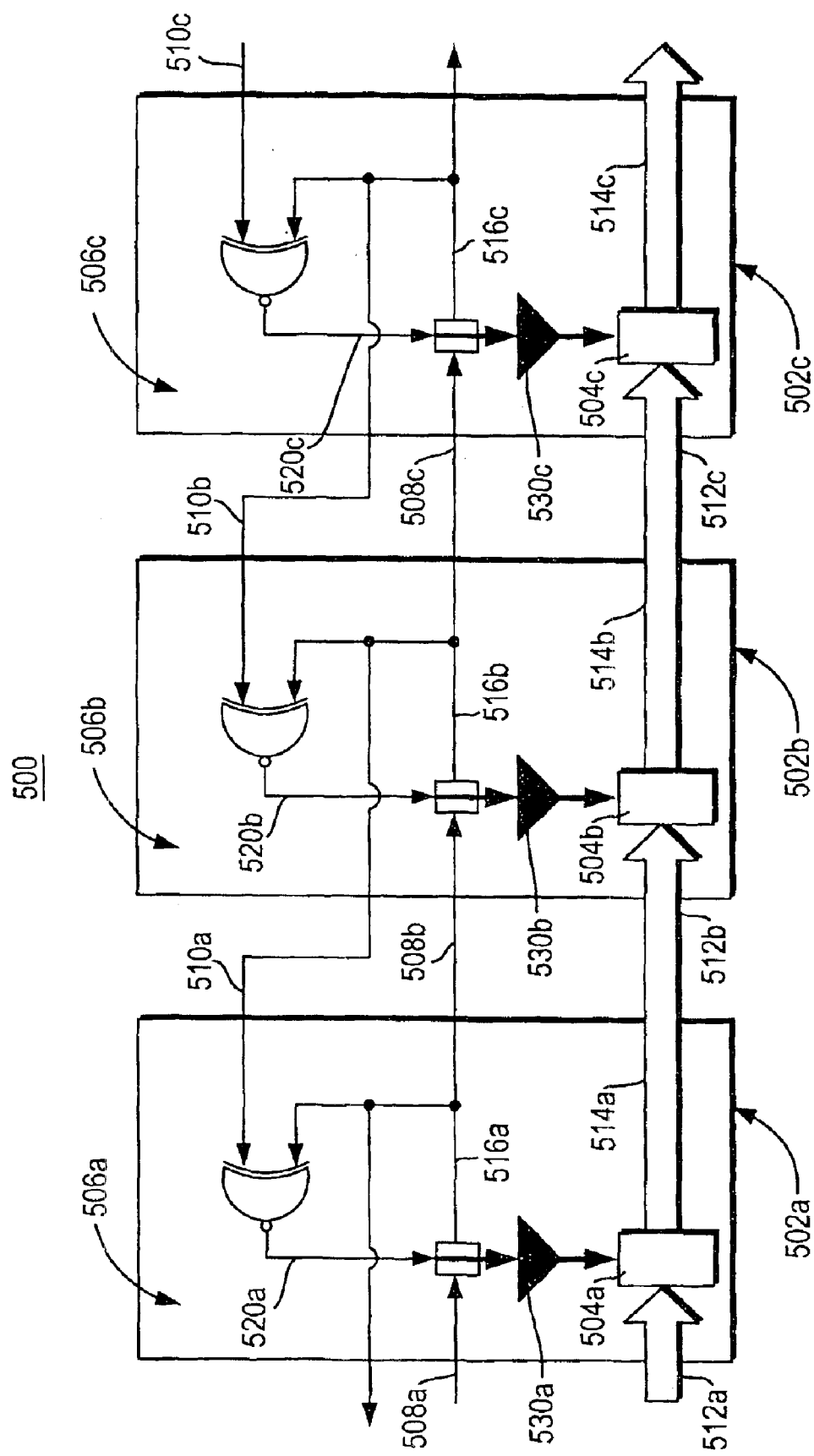
FIG. 10 is a schematic view of a fourth embodiment of a pipeline in accordance with the invention.

FIG. 10 illustrates how the second approach is implemented, for example, for a FIFO pipeline 500, which is substantially similar to pipeline 100, with the differences noted herein. Pipeline 500 comprises several stages: stage N−1 502a, stage N 502b, stage N+1 502c, each having a latch 504a, 504b, 504c, and a latch controllers 506a, 506b, 506c, as described for pipeline 100, above. The datapath for each stage 502a, 502b, 502c comprises a data input 512a, 512b, 512c, latch 504a, 504b, 504c and data output 514a, 514b, 514c. Pipeline 500 also comprises a buffer 530a, 530b, 530c inserted on the latch enable signal $En_{N-1}$ 520a, $En_N$ 520b, $En_{N+1}$ 520c, respectively. The buffer 530a, 503b, 530c is typically implemented as a chain of inverters, which amplifies the signal. As illustrated in FIG. 10, the buffers 530a, 530b, 530c are inserted after completion signals $done_{N-1}$ 516a, $done_N$ 516b, $done_{N+1}$ 516c are tapped off. (Since there are no delays in this embodiment, request signal $req_{N+1}$ 508c and acknowledgment signal $ack_N$ 510b are the same as completion signal $done_N$ 516b.) Consequently, the insertion of buffers 530a, 503b, 530c only delays the latching (and unlatching) of the datapath. The request signal of each stage, $req_{N-1}$ 508a, $req_N$ 508b, $req_{N+1}$ 508c is actually produced a buffer delay earlier than the data outputs 514a, 514b, 514c. By having uniform buffer delays across all stages, the pipeline 500 of FIG. 10 has the same cycle time and timing constraints as those derived in equations [1]–[8], above, for narrower datapaths.

A low-level circuit optimization is used in accordance with the invention to further improve the pipeline's performance under steady-state operation, i.e., "shaping" the XNOR output. A substantial bottleneck to pipeline performance for the pipelines 100, 200, 400 and 500, above, is that the XNOR's in the respective latch controllers must switch twice for every data item flowing through the pipeline, causing the latches to repeatedly close and open.

The proposed solution is to prevent the XNOR's output, i.e. the latch enable En, from falling completely to a "0" value, and thus to avoid closing the latches fully in steady state operation. This effect is achieved by slowing down the fall time of the XNOR, through transistor sizing. Consequently, in steady-state operation, both the critical up-transition of the XNOR, and the re-enabling of the latch have shorter delays due to reduced voltage swing.

This optimization is conceptually analogous to the behavior of a sliding door at a building entrance: the closing action of the door is deliberately slowed down, so that, when there is a steady stream of people passing through the entrance, the door never closes fully, allowing speedier passage. Consequently slowing down one action, i.e., slowing latch disable $^fXNOR_{N1}$, speeds up the overall operation of the pipeline.

This circuit optimization must be considered for its effect on the timing constraint to prevent data overrun as described above in connection with equation 8. This optimization may make the data overrun timing constraint more difficult to satisfy. In particular, slowing down the latch disable, i.e., increasing $^fXNOR_{N1}$, and speeding up the latch enable, i.e., decreasing $^rXNOR_{N-11}$, makes the term ($^fXNOR_{N1} - ^rXNOR_{N-11}$) now a non-zero positive quantity. As a result, the margin available to satisfy the inequality of Equation [8] is somewhat reduced. In practice, though, experiments indicate that this constraint can still be satisfied safely. (Further details are provided below.)

Figure 1:
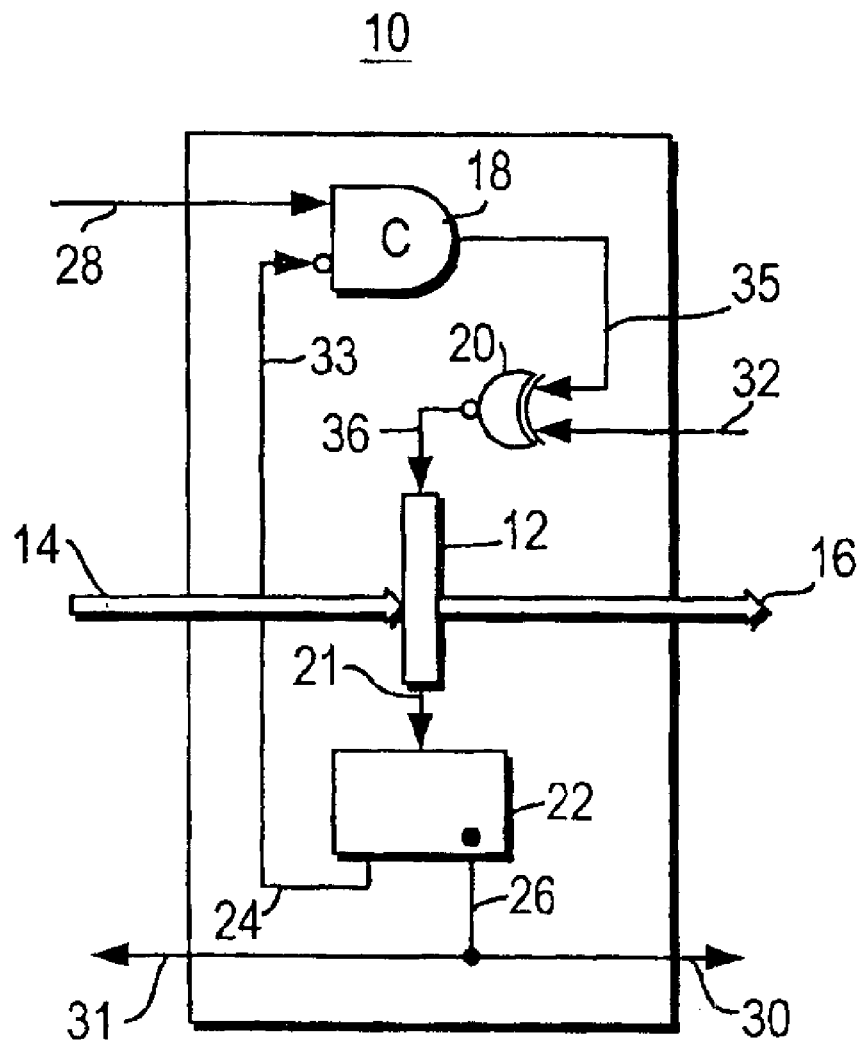
FIG. 1 is a schematic view of a portion of a prior art pipeline.

As will be described in greater detail below, the net impact is that the steady-state performance is as fast as that of a wave pipeline. (Wave pipelines are known in the art and described in, e.g., D. Wong, G. DeMicheli, and M. Flynn, "Designing High-Performance Digital Circuits Using Wave-Pipelining," *IEEE TCAD*, 12(1):24–46, January 1993; and O. Hauck, M. Garg, and S. A. Huss, "Two-Phase Asynchronous Wave-Pipelines and Their Application to a 2D-DCT," *Proc. Intl. Symp. Adv. Res. Async. Circ. Syst. (ASYNC)*, April 1999.) The new pipeline in accordance with the invention provides much greater robustness and require much simpler timing requirements than the wave pipeline. Consider the interface of a pipeline 100 with its right environment 160 (FIG. 1). Whether the right environment 160 suddenly stalls or speeds up, the pipeline 100 is capable of handling these variations. More particularly, if the right environment is slow and cannot respond with an acknowledgment signal $ack_{N+1}$ 110c, the rightmost pipeline stage 102c quickly makes its latch 104c opaque (since no acknowledgment signal $ack_{N+1}$ 110c is received by its XNOR 118c), thus preventing an overrun from the left stage 102b. If the right environment 160 is very fast, it is correctly stalled until the rightmost stage 102c can deliver it data, since the environment 160 is waiting for the stage's req signal 108d. The same reasoning also applies to the internal stages in the pipeline, making the pipeline robust to internal delay variations as well.

Figure 11:
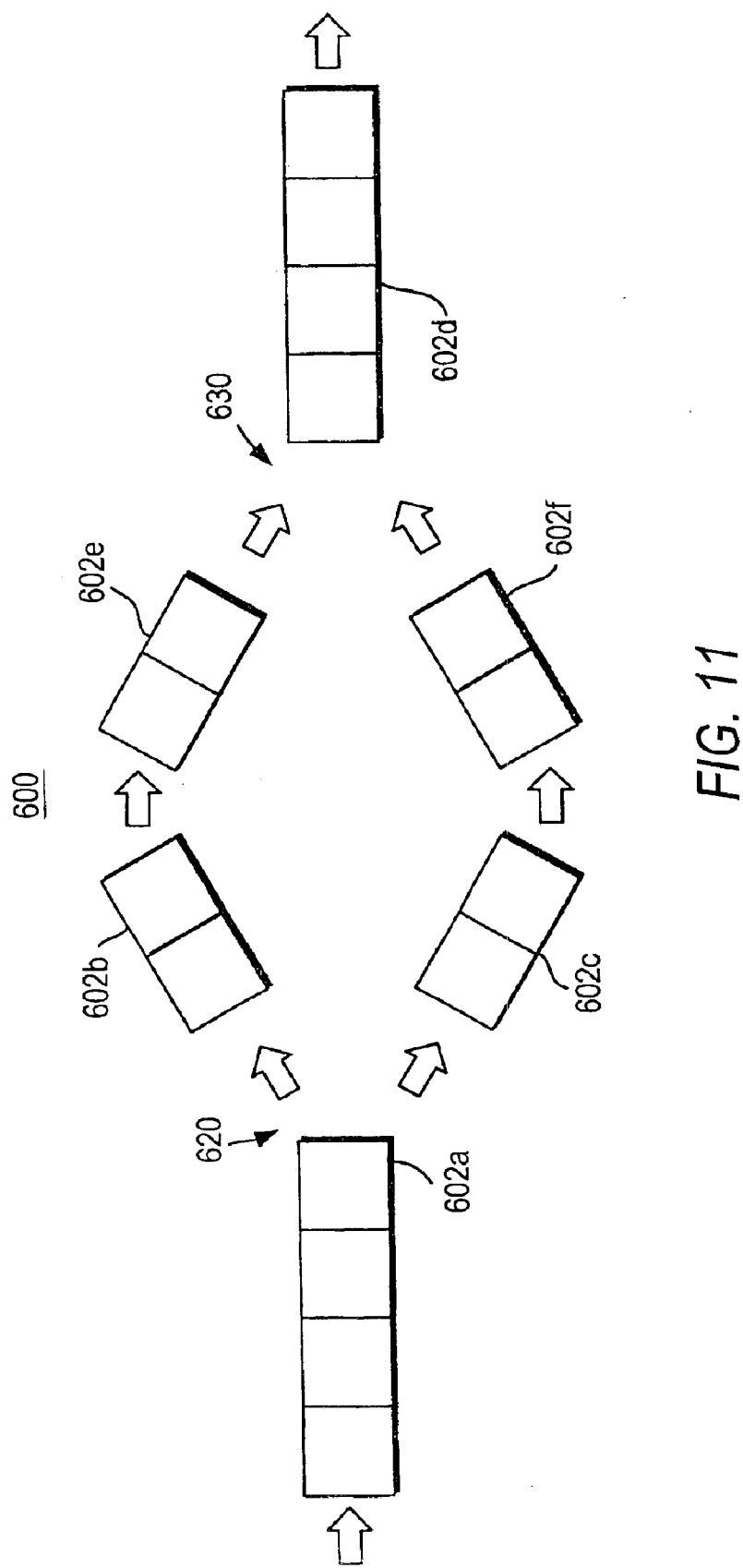
FIG. 11 is a schematic view of a fifth embodiment of a pipeline in accordance with the invention.

The foregoing discussion has focused on linear principles, which have many practical applications, especially to FIFO's or processor pipelines. However, in complex system architectures, there is often a need for non-linear pipelining as well, such as the structure of pipeline 600, illustrated in FIG. 11. Pipeline 600 incorporates two simple, yet novel, primitives—"fork" and "join"—which extend the applicability of pipelines described herein in accordance with the invention. Pipeline 600 has a fork structure 620, and a join structure 630. Fork structure 620 includes stage 602a, which provides a data output to both stages 602b and 602c. Join structure 630 includes stage 602d, which receives data inputs from both stages 602e and 602f. It is noted that pipelines may incorporate more or fewer forks and joins, as required by the particular application.

Figure 12:
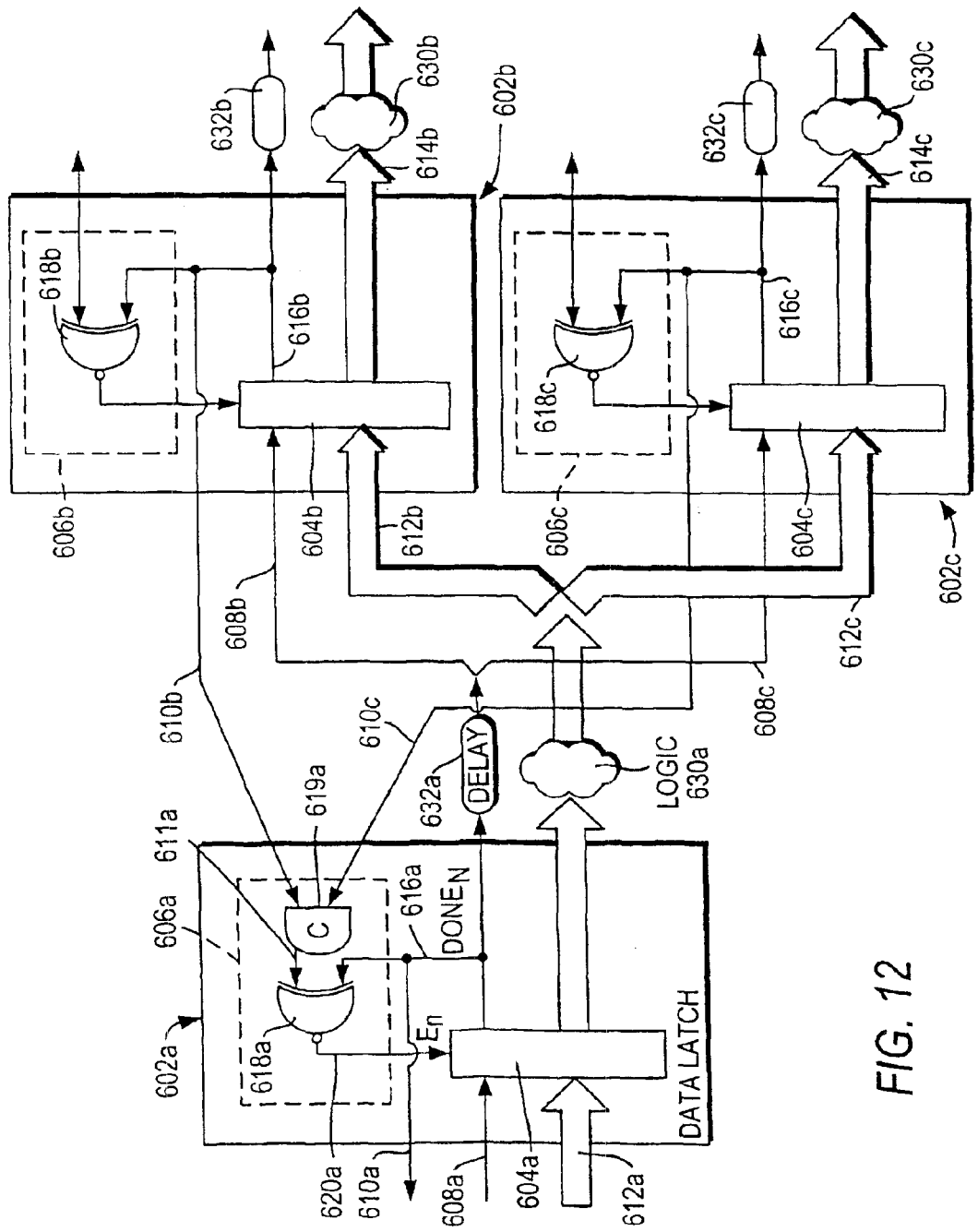
FIG. 12 is a detailed view of a portion of the pipeline illustrated in FIG. 11 in accordance with the invention.

FIG. 12 illustrates exemplary fork structure 620 of pipeline 600 in greater detail. Stage 602a is configured to supply data output to two destination stages 602b, 602c. Stages 602b and 602c are identical to stage 202a described above. Stage 602a is substantially identical to stage 202a described above, having differences noted herein. Latch controller 606a comprises an XNOR 618a as well as a Müller C-element 619a. Latch controller 606a produces an enable signal En 620a, which disables and enables latch 604a. Stage 602a receives a request signal $req_N$ 608a and data input 612a from the left environment, or a prior stage (not shown). A done signal $done_N$ 616a is provided as an input to the XNOR 618a in latch controller 606a, and is also provided to the left environment as acknowledgment signal $ack_{N-1}$ 610a. Combinational logic 630a and matched delay element 632a are also provided.

In the fork, the data output 612b, 612c and corresponding request signals $req_{N+1}(1)$ 608b and $req_{N+1}(2)$ 608c (a "matched done output," having matched delay applied by matched delay element 632a) are both forked to the two or more destination stages 602b, 602c. In turn, the two or more acknowledgment signals $ank_N(1)$ 610b and $ack_N(2)$ 610c are combined through the C-element 619a in the latch controller 606a. As illustrated in FIGS. 13–14, acknowledgment signals $ank_N(1)$ 610b and $ack_N(2)$ 610c are combined at a sequential component, such as Müller C-element 619a to produce output 611a. C-element 619a may include a weak inverter, or "keeper" 613a. As is well-known in the art, a C-element is an "event ANDer," i.e., its output makes a transition when all of its inputs change exactly once. (Further details of C-elements are described in Sutherland, "Micropipelines," incorporated by reference above). Output 611a of the C-element 619a, along with done signal $done_N$ 616a serve as the inputs to XNOR 118a.

Figure 15:
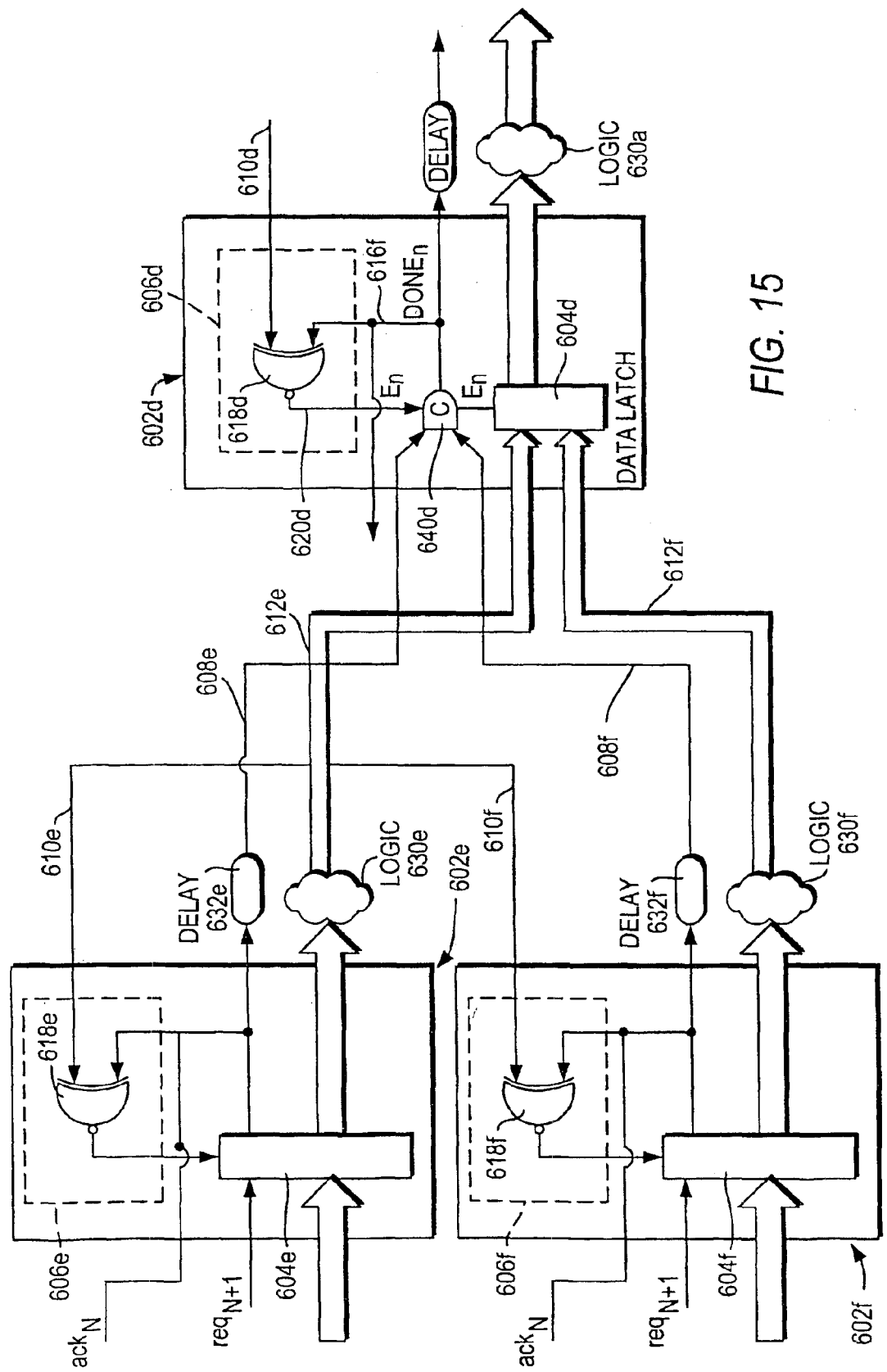
FIG. 15 is another detailed view of a portion of the pipeline illustrated in FIG. 11 in accordance with the invention.

FIG. 15 illustrates exemplary join structure 630 of pipeline 600 in greater detail. Stages 602e and 602f are identical to stage 202a. Stage 602d is substantially identical to stage 202a and stage 602a, described above, with several differences as noted herein. Stage 602d has a latch 604d, and latch controller 606d, which comprises an XNOR element 618d, and which provides an enable signal En 620d. The XNOR element 618d has a first input ack 610f received from the right environment and a second input done 616f received from aC element 640d.

Figure 16:
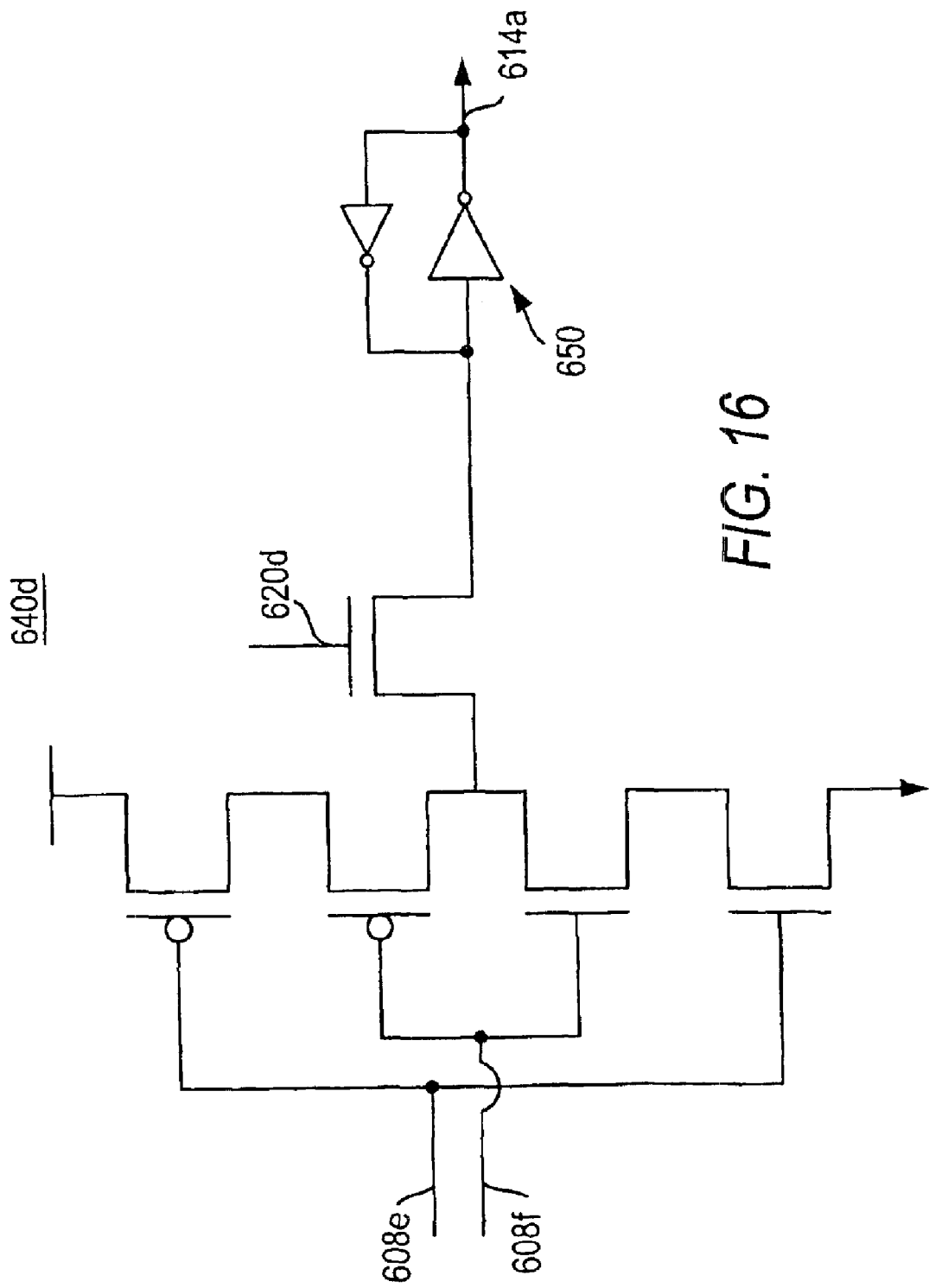
FIG. 16 is a detailed views of a portion of the pipeline illustrated in FIG. 15 in accordance with the invention.

The acknowledgment signal is simply a forked wire, communicating acknowledgment signals $ack_{N-1}(1)$ 610e and $ack_{N-1}(2)$ 610f to latch controllers 606e and 606f of sender stages, i.e., stages 602e and 602f. The request signals $req_N(1)$ 608e and $req_N(2)$ 608f (i.e., matched done inputs as described above) and their accompanying data inputs 612e and 612f received from stage 602e and 602f are combined as follows: the data inputs 612e and 612f are simply merged into one stream and latched together. The request signals $req_N(1)$ 608e and $req_N(2)$ 608f are merged using a sequential component, such as "gated" C-element 640d, controlled by the "latch enable" signal En 620d, as illustrated in FIG. 16. Whenever the "latch enable" signal En 620d is asserted, the output of the gated C-element 640d, i.e., done 616f, is 1 when all of the merged request signals $req_N(1)$ 608e and $req_N(2)$ 608f are 1, and the output of the gated C-element 640d is 0 when all of the merged request signals $req_N(1)$ 608e and $req_N(2)$ 608f are 0. At all other times, i.e., (a) when the "latch enable" signal En 620d is de-asserted, or (b) when the merged request signals $req_N(1)$ 608e and $req_N(2)$ 608f are not all equal, the gated C-element 640d simply holds its value. Latch enable signal 620d is passed down to latch 604d. At the transistor level, the pulldown network is a single series stack with one transistor for each req, as well as a transistor for the "latch enable". Similarly, the pullup network is a single series stack with one transistor for each req, and with a transistor for the complemented "latch enable".

Figure 17:
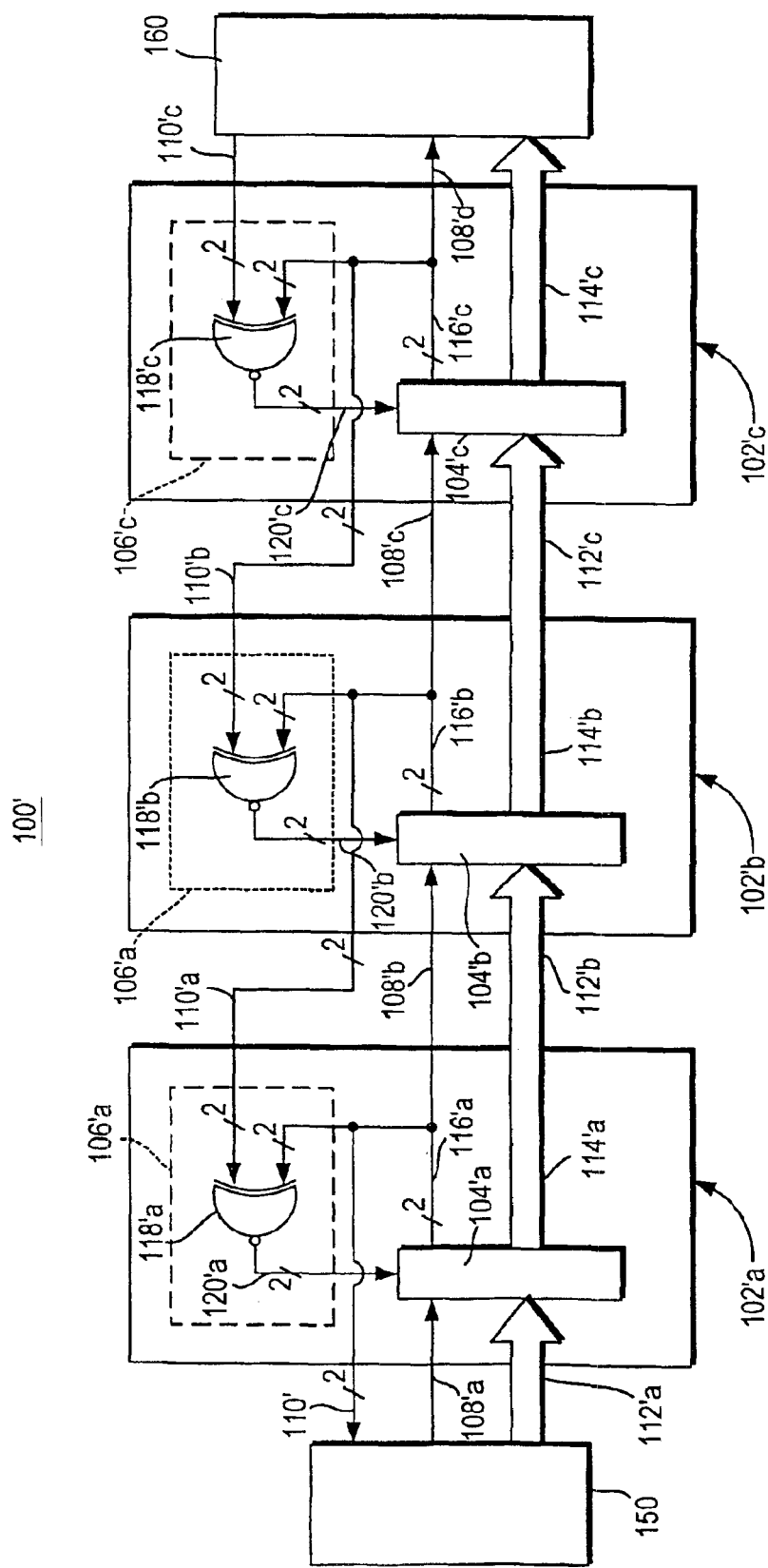
FIG. 17 is a schematic view of a sixth embodiment of a pipeline in accordance with the invention.

Another embodiment of the invention is the pipeline 100' illustrated in FIG. 17. Pipeline 100' is substantially identical to pipeline 100, described above, except that pipeline 100' uses a dual-rail structure for the request, done, and acknowledgement signals. More particularly, the latches 104'a, 104'b, 104'c, which process the request, done, and acknowledgment signals are substantially identical to dual-rail latch 460a, illustrated in FIG. 9, above. Similarly, the latch controller 106'a, 106'b, 106'c may include an XNOR element 118'a, 118'b, 118'c, which is implemented as a monotonic dual-rail gate, providing both exclusive OR, i.e., XOR, and exclusive NOR, i.e., XNOR, outputs, as is known in the art. The datapath itself, including data input 112'a, 112'b, 112'c and data output 114'a, 114'b, 114'c has a single rail structure, as with pipeline 100, above.

Figure 18:
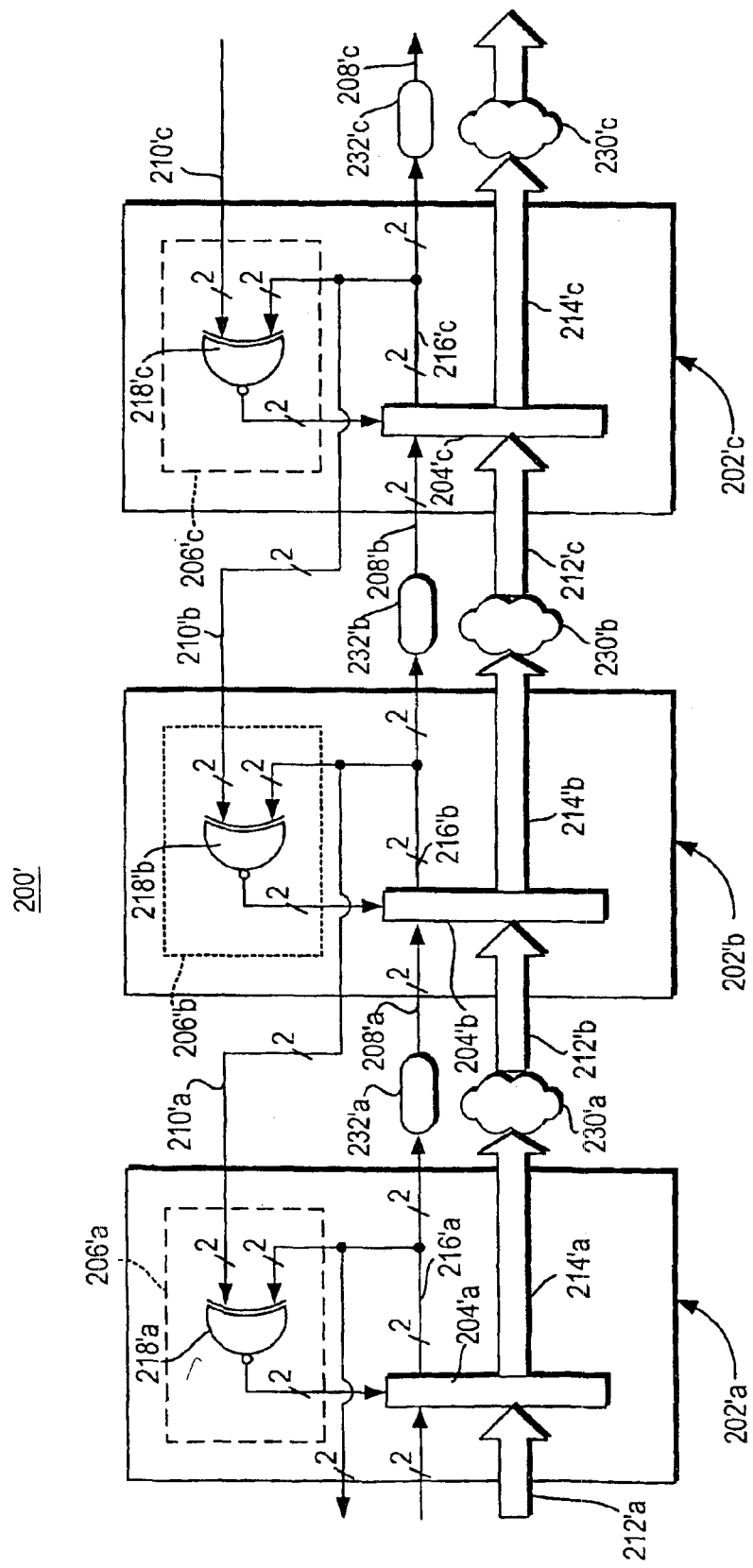
FIG. 18 is a schematic view of a seventh embodiment of a pipeline in accordance with the invention.
Figure 19:
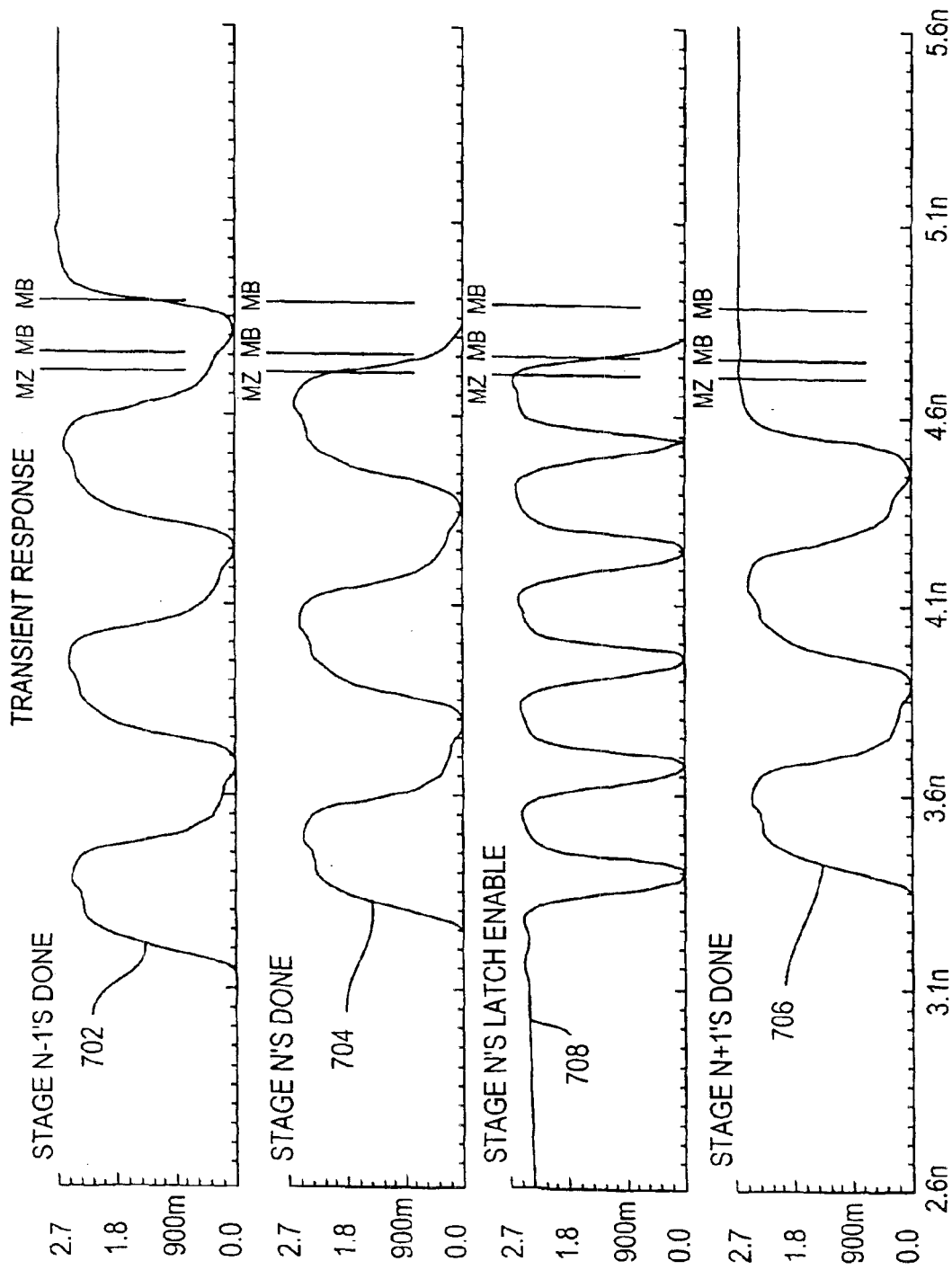
FIG. 19 is a time plot illustrating several signals of the pipeline of FIG. 2 in accordance with the invention.

A further embodiment of the invention is the pipeline 200' illustrated in FIG. 18. Pipeline 200' is substantially identical to pipeline 200, described above, except that pipeline 200' uses a dual-rail structure for processing the request, done, and acknowledgment signals. The latches 204'a, 204'b, 204'c that process the request, done, and acknowledgment signals are substantially identical to dual-rail latch 460a, illustrated in FIG. 9, above. Similarly, the latch controller 206'a, 206'b, 206'c may include an XNOR element 218'a, 218'b, 218'c, which is implemented as a monotonic dual-rail gate, providing both exclusive OR, i.e., XOR, and exclusive NOR, i.e., XNOR, outputs, as is known in the art. The datapath has a single-rail structure as with pipeline 200, above.

EXAMPLE

Simulations were carried out for several of the pipeline styles described herein, using HSPICE, for a basic pipeline, such as pipeline 100, above. A simple 10-stage FIFO was simulated (with no logic processing) on a 16-bit wide datapath. The FIFO was designed and simulated in two different CMOS technologies: (i) a Taiwan Semiconductor Manufacturing Company (TSMC) 0.25 micron CMOS process, which is well-known in the art, and (ii) a 0.6 μm Hewlett-Packard (HP) CMOS14TB process, which is also well-known in the art. For the first technology, only the unoptimized pipeline style was used: we did not include the "waveform shaping" optimization described above. For the second technology, both the optimized and the unoptimized versions of the pipeline were simulated. In each case, careful transistor sizing was used to improve performance.

The first simulation, using the 0.25 μm TSMC process, was performed assuming a 2.5V power supply, 300K temperature, and a normal process corner (which, as is well-known in the art, means that the simulations were performed assuming manufacturing conditions would yield an "average speed" chip, i.e., nearly half the chips produced by the foundry will have higher speed, and half the chips will have lower speed, compared with predicted by "normal process" simulations). Simple custom cells were designed: a pass-gate implementation of an XNOR/XOR pair, and a standard 6 transistor pass-gate dynamic D-latch.

Table 1 summarizes the results of pre-layout simulation. The overall pipeline cycle time T, is given, as well as a breakdown of a cycle into latch delay, $t_{Lt}$, and controller gate delays, $t_{XNOR1}$ and $t_{XNOR1}$. The initial results provided a 3.51 GigaHertz throughput.

TABLE 1

Performance of MOUSETRAP FIFO (0.25 μm TSMC technology)

| Pipeline Design | latch delay $t_{Lt}$ (ps) | XNOR delay $t_{XNOR1}$ (ps) | $t_{XNOR1}$ (ps) | Cycle Time, T Analytical Formula | (ps) | Throughput (Giga-Hertz) |
|---|---|---|---|---|---|---|
| 100 | 110 | 65 | 63 | $2 \cdot t_{Lt} + t_{XNOR1}$ | 285 | 3.51 |

These numbers compare favorably to the IPCMOS style of S. Schuster, W. Reohr, P. Cook, D. Heidel, M. Immediato, and K. Jenkins, "Asynchronous Interlocked Pipelined CMOS Circuits Operating at 3.3–4.5 GHz,: *Proc. ISSCC*, February 2000. However, their reported results of 3.3 GHz are for a high-performance IBM 0.18 μm process, which in practice is significantly faster than the 0.25 μm TSMC process used herein. (The IBM process is a high-performance copper interconnect process, whereas TSMC is a slower process that uses an alloy for interconnects. The IBM process is an advanced "silicon-on-insulator" (SOI) process, compared with TSMC's which was a conventional "bulk semiconductor" process.) When compared with the pipeline described herein, the IPCMOS critical path is made up of 12 levels of CMOS logic, plus a pass-gate. In contrast, the pipeline described herein only uses 5–6 levels of CMOS logic on its critical path (plus 2 if there are forks and joins in the datapath). In addition, the pipeline described herein has the benefit of much simpler circuit components and time constraints.

The second simulation was performed to evaluate the waveform shaping optimization described above. Currently, the simulation has only been performed in 0.6 μm (HP CMOS technology, 3.3V power supply, 300K temperature, normal process corner. The simulations indicate the benefit of the wave shaping approach. A plain FIFO was evaluated both with and without the optimization. The XNOR/XOR pair was once again designed with pass gates, but the latch was designed in the clocked-CMOS style (FIG. 6).

Table 2 shows the results of the second simulation. The unoptimized FIFO has a throughput of 1.67 GHz, and the optimized one has a throughput of 1.92 GHz, for a performance improvement of 15%. In addition, the timing constraint of Equation 8 (data overrun) is easily met: $t_{Lt}$=0.20 ns, $t_{logic}$=0 ns, and $t_{XNOR1}$-$t_{XNOR1}$=0.06 ns.

TABLE 2

Performance of MOUSETRAP FIFO's using clocked-CMOS logic (0.6 μm HP technology)

| Pipeline Design | C²MOS logic delay $t_{C^2MOS}$ (ns) | XNOR delay $t_{XNOR1}$ (ns) | $t_{XNOR1}$ (ns) | Cycle Time, T Analytical Formula | (ns) | Throughput (GigaHertz) |
|---|---|---|---|---|---|---|
| 100 | 0.22 | 0.16 | 0.13 | $2 \cdot t_{C^2MOS} + t_{XNOR1}$ | 0.60 | 1.67 |
| 100 optimized | 0.20 | 0.12 | 0.18 | $2 \cdot t_{C^2MOS} + t_{XNOR1}$ | 0.52 | 1.92 |

FIG. 16 illustrates waveforms for 3 adjacent stages (N−1, N and N+1) for a single simulation of the FIFO, in 0.25 μm TSMC technology. The simulation includes the done signals for each stage as well as the "latch enable" for stage N, i.e. output of the stage's controller. This waveform 702 corresponds to signal 116a of pipeline 100, waveform 704 corresponds to signal 116b, and waveform 706 corresponds to signal 116c. Waveform 708 corresponds to signal 120b of pipeline 100. Waveforms 702, 704, 706, and 708 are all time-dependent curves. The latch enable waveform 708 indicates that stage N's latch is disabled (enable=0) soon after stage N indicates it is done via waveform 704 (alternating 0 and 1 values), for every data item in the simulation. Similarly, the latch enable for stage N is re-enabled (enable=1) soon after stage N+1 indicates it is done, for every data item as well. The one-sided timing constraint between stage N and N−1 is clearly satisfied, even though no processing logic is present (such logic would improve margins): as shown at the right-hand side of the simulation, stage N's latch enable is disabled approximately 45 picoseconds before stage N−1 produces a new data token (done asserted).

It will be understood that the foregoing is only illustrative of the principles of the invention, and that various modifications can be made by those skilled in the art without departing from the scope and spirit of the invention.

What is claimed is:

1. An asynchronous digital pipeline circuit for processing data in an environment, the environment providing data for processing and a first request signal, the circuit comprising:
    a first processing stage comprising
        a first latch controller responsive to a second acknowledgment signal received from the environment and a first done signal received from a first data latch, and configured to assert a first enable signal when the second acknowledgment signal is received and to de-assert the first enable signal when the first done signal is received;

a first data latch having a setup time and configured to receive the data and the first request signal from the environment, wherein each signal transition on the first request signal indicates a new data item, the first data latch having an enabled phase and a disabled phase responsive to the first enable signal, wherein the data latch is enabled in the enabled phase to pass the data to a first data output and the data latch is disabled in the disabled phase, such that the passing of the data to the data output in the enabled phase also transmits a second request signal to the environment, transmits a first acknowledgment signal to the environment, and transmits the first done signal to the first latch controller, wherein the delay time comprising the receipt of first request signal to the transmitting of the first done signal $^t req_N - done_N$, the delay time associated with the first latch controller de-asserting the first enable signal, $^t LC_N 1$, and the setup time of the data latch, $^t su$, are related by the following equation:

$$^t req_N - done_N + ^t LC_N 1 > ^t su.$$

2. The asynchronous digital pipeline circuit of claim 1, wherein the first latch controller comprises a two-input XNOR element having the second acknowledgment signal as a first input, the first done signal as a second input, and the first latch enable signal as an output.

3. The asynchronous digital pipeline circuit of claim 2, wherein the XNOR element is a monotonic dual rail gate, the first done signal and the second acknowledgment signal are dual-rail inputs, the first enable signal is a dual-rail output, and the first data latch is configured to receive the first enable signal as a dual-rail input.

4. The asynchronous digital pipeline circuit of claim 1, further comprising:
a first buffer to amplify the first enable signal.

5. An asynchronous digital pipeline circuit for processing data in an environment, the environment providing data for processing and a first request signal, the circuit comprising:

first processing stage comprising first latch controller responsive to a second acknowledgment signal received from a second processing stage and a first done signal received from a first data latch, and configured to assert a first enable signal when the second acknowledgment signal is received and to de-assert the first enable signal when the first done signal is received;

first data latch configured to receive the data and the first request signal from the environment, wherein each signal transition on the first request signal indicates a new data item, the first data latch having an enabled phase and a disabled phase responsive to the first enable signal, wherein the first data latch is enabled in the enabled phase to pass data from the data input to a data output thereof and the first data latch is disabled in the disabled phase, wherein passing of the data from the first data latch to the data output in the enabled phase also transmits a first acknowledgment signal to the environment, and transmits a first done signal to the first latch controller and a first delay element;

first logic block configured to receive the data from the first data output, perform a combinational operation on the data, and to transmit the data to the second processing stage; and first delay element configured to receive the first done signal from the first data latch, apply a delay to the first done signal, and to transmit the delayed first done signal as the second request signal to the second processing stage; and second processing stage comprising second latch controller responsive to a third acknowledgment signal received from the environment and a second done signal received from a second data latch, and configured to assert a second enable signal when the third acknowledgment signal is received and to de-assert the second enable signal when the second done signal is received;

second data latch configured to receive the data and the second request signal from the first processing stage, wherein each signal transition on the second request signal indicates a new data item, the second data latch having an enabled phase and a disabled phase responsive to the second enable signal, wherein the second data latch is enabled in the enabled phase to pass data from a second data input to a second data output and the second data latch is disabled in the disabled phase, wherein passing of the data from the second data input to the second data output in the enabled phase also transmits the second acknowledgment signal to the first processing stage, and transmits the second done signal to the second latch controller and a second delay element;

second logic block configured to receive the data from the second data output, perform a combinational operation on the data, and to transmit the data to the environment; and second delay element configured to receive the second done signal from the second data latch, apply a delay to the second done signal, and to transmit the delayed second done signal as the third request signal to the environment, wherein the delay time of the first data latch, $^t Lt_{N-1}$, the delay time of the first logic block, $^t logic_{N-1}$, the rising transition time of the first latch controller, $^t LC_{N-11}$, the falling transition time of the second latch controller, $^t LC_{N1}$, and a hold time, $t_{hold}$, are related by the following equation:

$$^t Lt_{N-1} + ^t logic_{N-1} > (^t LC_{N1} - ^t LC_{N-11}) + t_{hold}.$$

6. The asynchronous digital pipeline circuit of claim 5, wherein the first latch controller further comprises a two-input XNOR element, having the second acknowledgment signal as a first input and the first done signal as a second input, and the first enable signal as an output.

7. The asynchronous digital pipeline circuit of claim 5, wherein the second latch controller further comprises a two-input XNOR element, having the third acknowledgment signal as a first input and the second done signal as a second input, and the second enable signal as an output.

8. The asynchronous digital pipeline circuit of claim 5, wherein the first data latch is a $C^2MOS$ gate.

9. The asynchronous digital pipeline circuit of claim 5, wherein the second data latch is a $C^2MOS$ gate.

10. The asynchronous digital pipeline circuit of claim 5, wherein the first latch controller is a monotonic dual rail gate, the first done signal and the second acknowledgment signal are dual-rail inputs, and the first enable signal is a dual-rail output.

11. The asynchronous digital pipeline circuit of claim 5, wherein the first latch controller is further configured to be responsive to a fourth acknowledgment signal received from a third processing stage in parallel with the second processing stage, wherein the first logic block is further configured to transmit the data the third processing stage, and wherein the first delay element is further configured to transmit the delayed first done signal as a fourth request signal to the third processing stage, the circuit further comprising:
- a third processing stage in parallel with the second processing stage comprising
- a third latch controller, and
- a third data latch.

12. The asynchronous digital pipeline circuit of claim 11, wherein the first latch controller further comprises:
- a sequential component configured to receive the second acknowledgment signal from a second processing stage as a first input and the fourth acknowledgment signal from a third processing stage as a second input, and to provide a first sequential component output; and
- a two-element XNOR element configured to receive the first sequential component output as a first input and the first done signal as a second intput, and to provide the first latch enable signal as an output.

13. The asynchronous digital pipeline circuit of claim 12, wherein the sequential component is configured to assert the first C-element output when the second acknowledgment signal and the fourth acknowledgment signal are asserted, to de-assert the first C-element output when the second acknowledgment signal and the fourth acknowledgment signal are de-asserted, and to otherwise hold the value of the first C-element output.

14. The asynchronous digital pipeline circuit of claim 12, wherein the sequential component is a Müller C-element.

15. An asynchronous digital pipeline circuit for processing data in an environment, the environment providing data for processing and a first and second request signal, the circuit comprising:
first processing stage comprising
- first latch controller configured to assert a first enable signal when a third acknowledgment signal is received from a third processing stage and to de-assert the first enable signal when a first done signal is received from a first data latch;
- first data latch configured to receive the data and the first request signal from the environment, wherein each signal transition on the first request signal indicates a new data item, the first data latch having an enabled phase and a disabled phase responsive to the first enable signal, wherein the first data latch is enabled in the enabled phase to pass data from a first data input to a first data output and the first data latch is disabled in the disabled phase, wherein passing of the data from the first data input to the first data output in the enabled phase also transmits a first acknowledgment signal to the environment, and transmits a first done signal to the first latch controller and a first delay element;
- first logic block configured to receive the data from the first data output, perform a combinational operation on the data, and to transmit the data to the third processing stage; and
- first delay element configured to receive the first done signal from the first data latch, apply a delay to the first done signal, and to transmit the delayed first done signal as a third request signal to the third processing stage;

second processing stage in parallel with the first processing stage comprising
- second latch controller configured to assert a second enable signal when the third acknowledgment signal is received from the third processing stage and to de-assert the second enable signal when a second done signal is received from a second data latch;
- second data latch configured to receive the data and the second request signal from the environment, wherein each signal transition on the second request signal indicates a new data item, the second data latch having an enabled phase and a disabled phase responsive to the second enable signal, wherein the second data latch is enabled in the enabled phase to pass data from a second data input to a second data output and the second data latch is disabled in the disabled phase, wherein passing of the data from the second data input to the second data output in the enabled phase also transmits a second acknowledgment signal to the environment, and transmits a second done signal to the second latch controller and a second delay element;
- second logic block configured to receive the data from the second data output, perform a combinational operation on the data, and to transmit the data to the third processing stage; and
- second delay element configured to receive the second done signal from the second data latch, apply a delay to the second done signal, and to transmit the delayed second done signal as a fourth request signal to the third processing stage; and third processing stage comprising
- third latch controller comprising configured to assert a third enable signal when a fifth acknowledgment signal is received from the environment and to de-assert the third enable signal when a third done signal is received from a third data latch;
- sequential logic element configured to receive the third enable signal, the third request signal, and the fourth request signal, and to transmit the third done signal;
- third data latch configured to receive the data from the first processing stage and the second processing stage and having an enabled phase and a disabled phase responsive to the third enable signal, wherein the third data latch is enabled in the enabled phase to pass data from a third data input to a third data output and the third data latch is disabled in the disabled phase.

16. The asynchronous digital pipeline circuit of claim 15, wherein the first latch controller further comprises a two-input XNOR element, having the third acknowledgment signal as a first input and the first done signal as a second input, and the first enable signal as an output.

17. The asynchronous digital pipeline circuit of claim 15, wherein the second latch controller further comprises a two-input XNOR element, having the third acknowledgment signal as a first input and the second done signal as a second input, and the second enable signal as an output.

18. The asynchronous digital pipeline circuit of claim 15, wherein the third latch controller further comprises a two-input XNOR element, having the fifth acknowledgment signal as a first input and the third done signal as a second input, and the third enable signal as an output.

19. The asynchronous digital pipeline circuit of claim 15, wherein the sequential logic element is configured to assert the third done signal when third enable signal, the third request signal, and the fourth request signal are asserted and to de-assert the third done signal when the third enable signal is asserted and the third request signal and the fourth request signal are de-asserted, and to otherwise hold the value of the third done signal.

20. The asynchronous digital pipeline circuit of claim 19, wherein the sequential logic element is a Müller gated C-element.

* * * * *